US012334689B2

(12) United States Patent
Wang et al.

(10) Patent No.: US 12,334,689 B2
(45) Date of Patent: Jun. 17, 2025

(54) DIFFERENTIAL PAIR MODULE, CONNECTOR, COMMUNICATIONS DEVICE, AND SHIELDING ASSEMBLY

(71) Applicant: HUAWEI TECHNOLOGIES CO., LTD., Guangdong (CN)

(72) Inventors: Zewen Wang, Dongguan (CN); Jun Chen, Dongguan (CN); Wang Xiong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 484 days.

(21) Appl. No.: 17/743,760

(22) Filed: May 13, 2022

(65) Prior Publication Data

US 2022/0271458 A1 Aug. 25, 2022

Related U.S. Application Data

(63) Continuation of application No. PCT/CN2020/093573, filed on May 30, 2020.

(30) Foreign Application Priority Data

Nov. 14, 2019 (CN) ........................ 201921986199.4

(51) Int. Cl.

*H01R 13/658* (2011.01)
*H01R 13/6587* (2011.01)
*H01R 12/58* (2011.01)

(52) U.S. Cl.

CPC ......... *H01R 13/6587* (2013.01); *H01R 12/58* (2013.01)

(58) Field of Classification Search

None

See application file for complete search history.

(56) References Cited

U.S. PATENT DOCUMENTS

| | | | | |
|---|---|---|---|---|
| 5,024,609 | A | 6/1991 | Piorunneck | |
| 9,300,074 | B2 * | 3/2016 | Gailus | H01R 13/46 |
| 11,309,655 | B2 * | 4/2022 | Avery | H01R 13/514 |

(Continued)

FOREIGN PATENT DOCUMENTS

| | | | |
|---|---|---|---|
| CN | 101395766 | A | 3/2009 |
| CN | 101964469 | A | 2/2011 |
| CN | 102185196 | A | 9/2011 |

(Continued)

*Primary Examiner* — Ross N Gushi

(74) *Attorney, Agent, or Firm* — WOMBLE BOND DICKINSON (US) LLP

(57) ABSTRACT

This application provides a differential pair module, including a first signal terminal and a second signal terminal. The first signal terminal includes a first signal tail part, a first signal body part, and a first signal conductive connection part that are successively connected. An extension plane of the first signal conductive connection part and an extension plane of the first signal body part form an included angle, and an extension direction of the first signal conductive connection part and an extension direction of the first signal tail part form an included angle. The second signal terminal includes a second signal tail part, a second signal body part, and a second signal conductive connection part that are successively connected. Solutions in this application can implement a PCB board connection architecture having no backplane.

17 Claims, 20 Drawing Sheets

(56) References Cited

U.S. PATENT DOCUMENTS

| | | | |
|---|---|---|---|
| 2016/0308309 | A1 | 10/2016 | Stokoe et al. |
| 2017/0025783 | A1 | 1/2017 | Astbury et al. |

FOREIGN PATENT DOCUMENTS

| | | | |
|---|---|---|---|
| CN | 102405564 | A | 4/2012 |
| CN | 102570104 | A | 7/2012 |
| CN | 102623852 | A | 8/2012 |
| CN | 102684009 | A | 9/2012 |
| CN | 203277706 | U | 11/2013 |
| CN | 203645075 | U | 6/2014 |
| CN | 204271372 | U | 4/2015 |
| CN | 105284009 | A | 1/2016 |
| CN | 105206961 | B | 5/2018 |
| CN | 108352633 | A | 7/2018 |
| CN | 109830849 | A | 5/2019 |
| CN | 110212377 | A | 9/2019 |
| CN | 212162125 | U | 12/2020 |
| CN | 214204177 | U | 9/2021 |
| EP | 1496578 | A1 | 1/2005 |
| JP | 2012204083 | A | 10/2012 |
| JP | 2013524479 | A | 6/2013 |
| TW | M507095 | U | 8/2015 |
| TW | 201806266 | A | 2/2018 |

* cited by examiner

232

231

DIFFERENTIAL PAIR MODULE, CONNECTOR, COMMUNICATIONS DEVICE, AND SHIELDING ASSEMBLY

CROSS-REFERENCE TO RELATED APPLICATIONS

This application is a continuation of International Application No. PCT/CN2020/093573, filed on May 30, 2020, which claims priority to Chinese Patent Application No. 201921986199.4, filed on Nov. 14, 2019. The disclosures of the aforementioned applications are hereby incorporated by reference in their entireties.

TECHNICAL FIELD

This application relates to the field of communications devices, and in particular, to a differential pair module, a connector, a communications device, and a shielding assembly.

BACKGROUND

A printed circuit board (PCB) board in a switch includes service line cards and network switch cards. As shown in FIG. 1, service line cards 11 and network switch cards 13 in a conventional switch are inserted into two opposite sides of a backplane 12 through connectors. A plane in which the service line cards 11 are located is perpendicular to a plane in which the network switch cards 13 are located. Signal interconnection is implemented between the service line cards 11 and the network switch cards 13 by using the backplane 12. In such an architecture, the backplane 12 divides internal space of a chassis of the switch, resulting in relatively poor ventilation and heat dissipation performance of the chassis. In addition, a signal between the service line cards 11 and the network switch cards 13 needs to be transmitted by using a PCB trace of the backplane 12. Consequently, a signal link is relatively long, and high-speed data transmission is difficult to implement.

SUMMARY

This application provides a differential pair module, a connector including the differential pair module, and a communications device including the connector, to directly connect a service line card and a network switch card without using a backplane, so that ventilation and heat dissipation performance of the communications device can be improved, a signal link can be shortened, and the communications device can implement high-speed data transmission.

According to a first aspect, this application provides a differential pair module, including a first signal terminal and a second signal terminal. The first signal terminal includes a first signal tail part, a first signal conductive connection part, and a first signal body part connected between the first signal tail part and the first signal conductive connection part, the first signal conductive connection part is connected in a bent manner to the first signal body part, an extension plane of the first signal conductive connection part and an extension plane of the first signal body part form an included angle, and an extension direction of the first signal conductive connection part and an extension direction of the first signal tail part form an included angle. The second signal terminal includes a second signal tail part, a second signal conductive connection part, and a second signal body part connected between the second signal tail part and the second signal conductive connection part, the second signal conductive connection part is connected in a bent manner to the second signal body part, an extension plane of the second signal conductive connection part and an extension plane of the second signal body part form an included angle, and an extension direction of the second signal conductive connection part and an extension direction of the second signal tail part form an included angle. The second signal body part and the first signal body part are stacked with a specific spacing and form a broadside coupling, and the second signal conductive connection part and the first signal conductive connection part are stacked with a specific spacing and form an edge coupling.

In this application, the differential pair module is disposed on a first PCB board, and includes two submodules assembled together, and each submodule includes a signal terminal (which is a generic term of the first signal terminal and the second signal terminal, and this rule also applies to the following description). The signal terminal is configured to be inserted into a connector on the second PCB board (which may be referred to as a second PCB board connector). A normal line of the extension plane of the signal body part and a normal line of the extension plane of the signal conductive connection part are along respective thickness directions. That the extension plane of the signal body part and the extension plane of the signal conductive connection part form an included angle means that the signal conductive connection part is bent relative to the signal body part. The included angle may be an acute angle, a right angle, or an obtuse angle. The extension direction of the signal conductive connection part is a direction in which the signal conductive connection part is inserted into the second PCB board connector. The extension direction of the signal tail part is a direction in which the signal tail part is inserted into the first PCB board. That the extension direction of the signal conductive connection part and the extension direction of the signal tail part form an included angle means that the signal conductive connection part is bent relative to the signal tail part. The included angle may be a right angle or a non-right angle.

In this application, the broadside coupling means that broader extension planes between signal body parts are spaced relatively close to and face away from each other, and a signal coupling exists between the signal body parts. The edge coupling means that narrower side surfaces between signal conductive connection parts (the side surfaces are vertically connected to extension planes of the signal conductive connection parts) are spaced relatively close to and opposite to each other, and a signal coupling exists between the signal conductive connection parts.

In this application, the signal conductive connection part is bent relative to the signal tail part, and when the differential pair module is mounted at an edge of the first PCB board, signal tail parts are all inserted into the first PCB board, and the signal conductive connection parts may all protrude from a side edge of the first PCB board. This enables the differential pair module to adapt to an orthogonal placement manner of the first PCB board and the second PCB board. Because the signal conductive connection part is bent relative to the signal body part, the signal conductive connection part and the second PCB board connector can be directly connected in parallel to each other without using a relay of a backplane connector. In this way, the differential pair module can be used to implement a direct orthogonal interconnection between the first PCB board and the second PCB board, so that a communications device does not need a backplane. Because no backplane needs to be disposed, a signal link between the first PCB board and the second PCB board can be shortened, and the communications device can implement high-speed data transmission and has better ventilation and heat dissipation performance. In addition, the differential pair module can implement a transition from the broadside coupling between signal body parts to the edge coupling between signal conductive connection parts, thereby satisfying a product requirement.

In an embodiment, the extension direction of the first signal conductive connection part is parallel to the extension plane of the first signal body part. Such a structure is easy to process and is convenient to implement insertion fitting with the second PCB board connector.

In an embodiment, an angle value of the included angle formed by the extension plane of the first signal conductive connection part and the extension plane of the first signal body part is equal to an angle value of the included angle formed by the extension plane of the second signal conductive connection part and the extension plane of the second signal body part. In this way, the two signal terminals can form a corresponding structure, which is convenient for processing and for inserting into the second PCB board connector.

In an embodiment, the first signal tail part is coplanar with the first signal body part, and the second signal tail part is coplanar with the second signal body part. Such a structure is easy to process and is convenient to connect the signal tail part and the first PCB board.

In an embodiment, the first signal body part has a first region connected to the first signal tail part, the second signal body part has a second region connected to the second signal tail part, the first region intersects with the second region, the first region is bent towards the second signal body part, and the second region is bent towards the first signal body part, so that the first signal tail part and the second signal tail part form an edge coupling. The signal tail parts can form the edge coupling through cross-twisting to satisfy requirements of signal cable arrangement and component arrangement on the first PCB board.

In an embodiment, the differential pair module includes a first ground terminal and a second ground terminal; the first ground terminal is spaced from the first signal terminal, the first ground terminal includes a first ground body part and a first ground part that are connected to each other, the first ground body part is coplanar with the first signal body part, and the first ground part and the first signal tail part are located on a same side of the first signal body part; and the second ground terminal is spaced from the second signal terminal, the second ground terminal includes a second ground body part and a second ground part that are connected to each other, the second ground body part is coplanar with the second signal body part, and the second ground part and the second signal tail part are located on a same side of the second signal body part.

In an embodiment, the first ground part is coplanar with the first ground body part, and the second ground part is coplanar with the second ground body part. Such a structure is easy to process and can satisfy requirements of ground cable arrangement and component arrangement on the first PCB board.

In an embodiment, one first signal terminal is disposed between two first ground terminals, and a first ground part of one of the two first ground terminals is bent towards the second ground body part and is coplanar with the second signal tail part to form an edge coupling; one second signal terminal is disposed between two second ground terminals, and a second ground part of one of the two second ground terminals is bent towards the first ground body part and is coplanar with the first signal tail part to form an edge coupling; and the first ground part and the second ground part forming the edge couplings are arranged diagonally. The ground parts that form the edge couplings may be connected to form one diagonal line of a quadrangle, and ground parts that do not form an edge coupling may be connected to form the other diagonal line of the quadrangle. Such a structure can satisfy requirements of ground cable arrangement and component arrangement on the first PCB board.

In an embodiment, both the first ground part and the second ground part forming the edge couplings form a fisheye structure. By using the fisheye structures, the ground parts forming the edge couplings are conveniently inserted into the first PCB board.

In an embodiment, the differential pair module includes a first terminal bearing member and a second terminal bearing member that are disposed in a stacked manner; both the first signal body part and the first ground body part are disposed on the first terminal bearing member, and the first signal conductive connection part, the first signal tail part, and the first ground part all extend outside the first terminal bearing member; and both the second signal body part and the second ground body part are disposed on the second terminal bearing member, and the second signal conductive connection part, the second signal tail part, and the second ground part all extend outside the second terminal bearing member. The terminal bearing members can reliably bear terminals (a generic term of signal terminals and ground terminals) to ensure transmission of electrical signals between the terminals. The terminal bearing members may be connected as a whole, or may be separately designed and then assembled together.

In an embodiment, the differential pair module includes a first shielding bracket, a first shielding member, a second shielding bracket, and a second shielding member; the first shielding bracket covers the first terminal bearing member, and the first shielding member is disposed on a side that is of the first shielding bracket and that faces the first terminal bearing member; and the second shielding bracket covers the second terminal bearing member and is located on a side that is of the second terminal bearing member and that faces away from the first terminal bearing member, and the second shielding member is disposed on a side that is of the second shielding bracket and that faces the second terminal bearing member. Desirable electromagnetic protection can be provided for the terminals and electrical performance of the terminals can be ensured by disposing the shielding brackets and the shielding members. In addition, the terminal bearing members that bear terminals can be packaged, to provide a reliable working environment for the terminals and enhance mechanical strength of the entire differential pair module.

In an embodiment, a surface of the first shielding bracket, a surface of the first shielding member, a surface of the second shielding bracket, and a surface of the second shielding member are all provided with a conducting layer. An electromagnetic shielding effect can be improved by disposing the conducting layers.

In an embodiment, a surface that is of the first terminal bearing member and that faces the first shielding member and corresponds to the first signal body part is provided with an opening, and the first signal body part is exposed from the opening and is spaced opposite to the first shielding member. The opening may be located in the vicinity of the first signal body part, for example, in a thickness direction of the first signal body part. The opening may fall within a boundary of the first signal body part, or the opening may overlap the boundary portion of the first signal body part, or the first signal body part may fall within a boundary of the opening. A shape, a size, and a quantity of the opening may be set depending on a requirement. For example, an opening may be formed corresponding to a location of each first signal body part. When there are a plurality of openings, the openings are spaced from each other. Impedance and signal attenuation of the first signal terminal can be adjusted by disposing the opening.

In an embodiment, a first limiting protrusion is disposed on a surface that is of the first shielding bracket and that faces the first terminal bearing member, the first shielding member has a first hollowed-out region, a first limiting through hole is disposed in the first terminal bearing member, and the first limiting protrusion passes through the first hollowed-out region and is inserted into the first limiting through hole. Fitting between the first limiting protrusion and the first limiting through hole can facilitate a connection between the first shielding bracket and the first terminal bearing member, and enhance insertion strength of the differential pair module.

In an embodiment, a fitting through hole is disposed in the first ground body part, the fitting through hole corresponds to the first limiting through hole, and the first limiting protrusion is inserted into the first limiting through hole and the fitting through hole. In this way, the first limiting protrusion not only can connect the first shielding bracket and the first terminal bearing member, but also can separate adjacent first signal terminals, thereby reducing signal crosstalk between the adjacent first signal terminals.

In an embodiment, there are a plurality of first limiting protrusions, the plurality of first limiting protrusions are spaced from each other, there are a plurality of first limiting through holes and a plurality of fitting through holes, and one limiting protrusion is correspondingly inserted into one limiting through hole and one fitting through hole. Fitting between the plurality of first limiting protrusions, the plurality of first limiting through holes, and the plurality of fitting through holes greatly enhances the insertion strength and reduces crosstalk.

In an embodiment, a second limiting protrusion is disposed on a surface that is of the second shielding bracket and that faces the second terminal bearing member, the second shielding member has a second hollowed-out region, a second limiting through hole is disposed in the second terminal bearing member, the second limiting protrusion passes through the second hollowed-out region and is inserted into the second limiting through hole, and the second limiting protrusion is connected to the first limiting protrusion. Fitting between the second limiting protrusion and the second limiting through hole can facilitate a connection between the second shielding bracket and the second terminal bearing member, and enhance the insertion strength of the differential pair module. In addition, the two terminal bearing members can be connected and packaged through fitting between the second limiting protrusion and the first limiting protrusion, to form the differential pair module with reliable insertion strength.

According to a second aspect, this application provides a connector, including several differential pair modules. The connector can implement a PCB board interconnection architecture having no backplane, so that a communications device can implement high-speed data transmission and has better ventilation and heat dissipation performance. In addition, the connector can implement a transition from a broadside coupling between signal body parts to an edge coupling between signal conductive connection parts, thereby satisfying a product requirement.

In an embodiment, the connector includes an assembling bracket, where the assembling bracket is disposed on a same side of all the differential pair modules, several first through holes arranged at intervals are disposed on the assembling bracket, one first signal tail part and one second signal tail part thread through one first through hole correspondingly, and neither of them comes into contact with a hole wall of the first through hole. By designing the assembling bracket, all the differential pair modules can be connected to satisfy the product requirement.

In an embodiment, several second through holes arranged at intervals are disposed on the assembling bracket; each differential pair module includes a first ground terminal and a second ground terminal, the first ground terminal is spaced from a first signal terminal, the first ground terminal includes a first ground body part and a first ground part that are connected to each other, the first ground body part is coplanar with a first signal body part, and the first ground part and a first signal tail part are located on a same side of the first signal body part; the second ground terminal is spaced from a second signal terminal, the second ground terminal includes a second ground body part and a second ground part that are connected to each other, the second ground body part is coplanar with a second signal body part, and the second ground part and a second signal tail part are located on a same side of the second signal body part; and the first ground part and the second ground part separately come into contact with a hole wall of one second through hole. The ground parts come into contact with inner walls of second through holes of the assembling bracket to implement grounding. The assembling bracket can serve as a common ground for all the differential pair modules.

According to a third aspect, this application provides a communications device, including a first PCB board, a second PCB board, a second PCB board connector, and the connector, where the first PCB board is perpendicular to the second PCB board, and a side surface of the first PCB board is opposite to a side surface of the second PCB board, the second PCB board connector is disposed on the second PCB board, a first signal tail part of the connector is inserted into the first PCB board, and a first signal conductive connection part is inserted into the second PCB board connector. The communications device uses a PCB board interconnection architecture having no backplane, so that the communications device can implement high-speed data transmission and has better ventilation and heat dissipation performance.

According to a fourth aspect, this application provides a shielding assembly of a connector. The shielding assembly includes a first shielding bracket and a first shielding member, the first shielding bracket and the first shielding member are stacked and connected as a whole, and both a surface of the first shielding bracket and a surface of the first shielding member form a conducting layer. The shielding assembly can implement electromagnetic shielding of the connector and enhance mechanical strength of the connector.

In an embodiment, a first limiting protrusion is formed on the surface of the first shielding bracket, the first shielding member has a first hollowed-out region, and the first limiting protrusion passes through the first hollowed-out region. Such a structure is relatively simple and reliable, and can implement a connection between the first shielding bracket and the first shielding member.

In an embodiment, there are a plurality of first limiting protrusions, the plurality of first limiting protrusions are spaced from each other, there are a plurality of first hollowed-out regions, and one first limiting protrusion correspondingly passes through one first hollowed-out region. Such a structure can enhance insertion strength between the first shielding bracket and the first shielding member.

In an embodiment, the plurality of first limiting protrusions are arranged in a plurality of spaced rows, and a plurality of spaced first limiting protrusions are included in each row. Such a structure can enhance insertion strength between the first shielding bracket and the first shielding member.

In an embodiment, the shielding assembly includes a second shielding bracket and a second shielding member that are connected as a whole, the second shielding member is adjacent to the first shielding member, and the first shielding bracket and the second shielding bracket are disposed facing away from each other; and a second limiting protrusion is formed on a surface of the second shielding bracket, the second shielding member has a second hollowed-out region, and the second limiting protrusion passes through the second hollowed-out region and is connected to the first limiting protrusion. Such a structure can enhance insertion strength of the shielding assembly.

BRIEF DESCRIPTION OF DRAWINGS

To describe technical solutions in embodiments of this application or in the background, the following describes the accompanying drawings required for describing the embodiments of this application or the background.

FIG. 26(*b*) is a schematic diagram of a side view structure of direct mutual fitting between PCB boards in a PCB board interconnection architecture according to an embodiment of this application;

DESCRIPTION OF EMBODIMENTS

Figure 1:
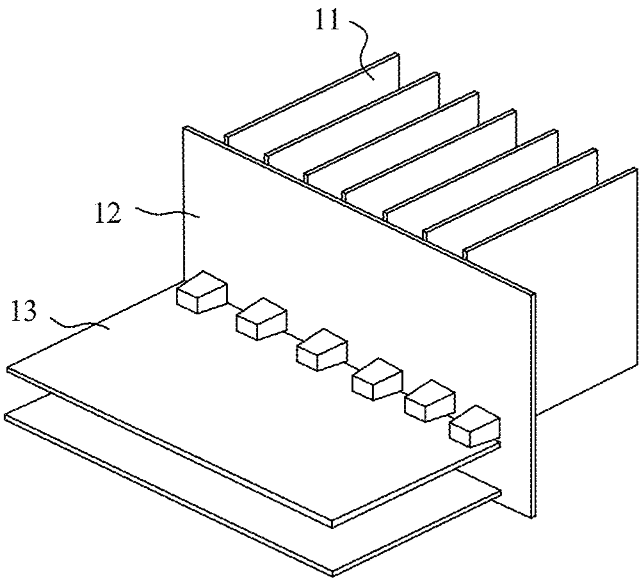
FIG. 1 (Prior Art)
FIG. 1 is a schematic diagram of a PCB board interconnection architecture in a conventional switch.
Figure 2:
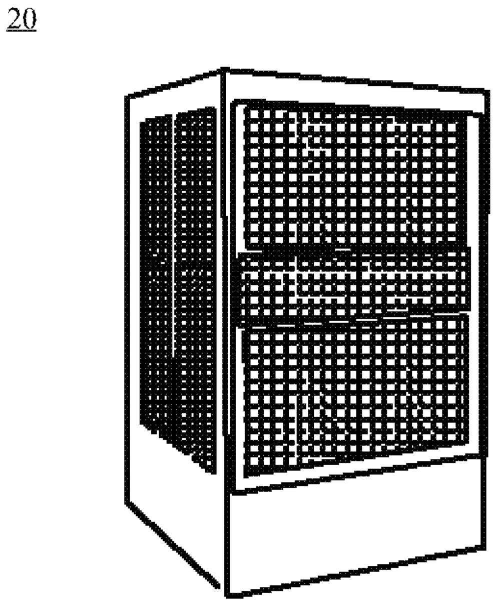
FIG. 2 is a schematic diagram of an overall structure of a communications device according to a first embodiment of this application.

As shown in FIG. 2, an embodiment of this application provides a communications device 20, including but not limited to a switch and a server. The communications device 20 includes several PCB boards, and the PCB board may include a service PCB board (which may provide an external physical interface for service transmission to complete packet receiving and sending, and may also perform some protocol processing and switching/routing functions) and a switch PCB board (which may be responsible for data forwarding and switching, packet switching, distribution, scheduling, and control, and other functions). The PCB boards are interconnected through connectors.

Figure 3:
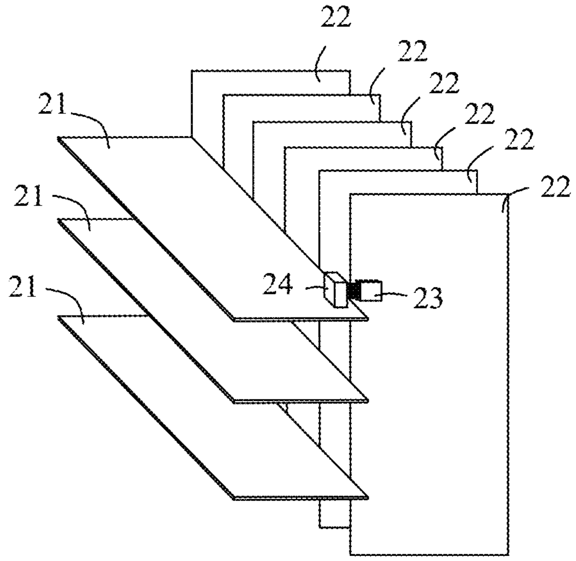
FIG. 3 is a schematic diagram of a PCB board interconnection architecture in the communications device in FIG. 2.

Specifically, as shown in FIG. 3, the communications device 20 may include a first PCB board 22, a second PCB board 21, a first PCB board connector 23, and a second PCB board connector 24. The first PCB board 22 may be a switch PCB board (or a service PCB board), the second PCB board 21 may be a service PCB board (or a switch PCB board), and there may be several first PCB boards 22 and several second PCB boards 21. The first PCB board 22 is perpendicular to the second PCB board 21, and a side surface of the first PCB board 22 is opposite to a side surface of the second PCB board 21. The side surface is a surface that has a relatively small area in the PCB board and whose normal direction is perpendicular to a thickness direction of the PCB board. The first PCB board connector 23 is disposed at an edge of the first PCB board 22, the second PCB board connector 24 is disposed at an edge of the second PCB board 21, and the first PCB board connector 23 is inserted into the second PCB board connector 24, to interconnect the first PCB board 22 and the second PCB board 21, thereby implementing data transmission.

In this embodiment of this application, a terminal of the first PCB board connector 23 has a bending design, and the second PCB board connector 24 is a conventional connector. Alternatively, a terminal of the second PCB board connector 24 may have a bending design, and the first PCB board connector 23 may be a conventional connector. The following uses an example for detailed description in which the first PCB board connector 23 (referred to as a connector 23 for short below) has a bending design.

Figure 4:
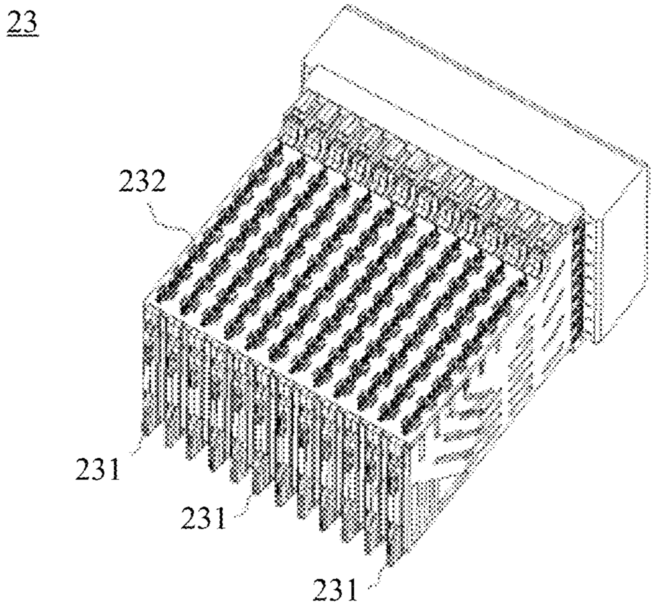
FIG. 4 is a schematic diagram of an assembly structure of a connector in the communications device in FIG. 2.
Figure 5:
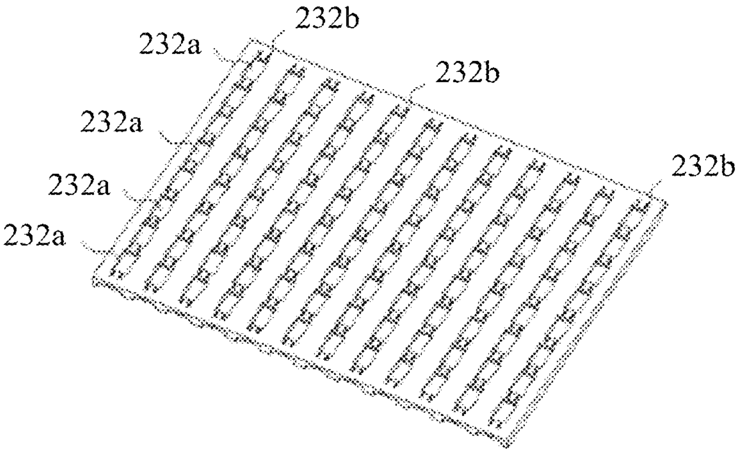
FIG. 5 is a schematic diagram of an overall structure of an assembling bracket of the connector in FIG. 4.
Figure 6:
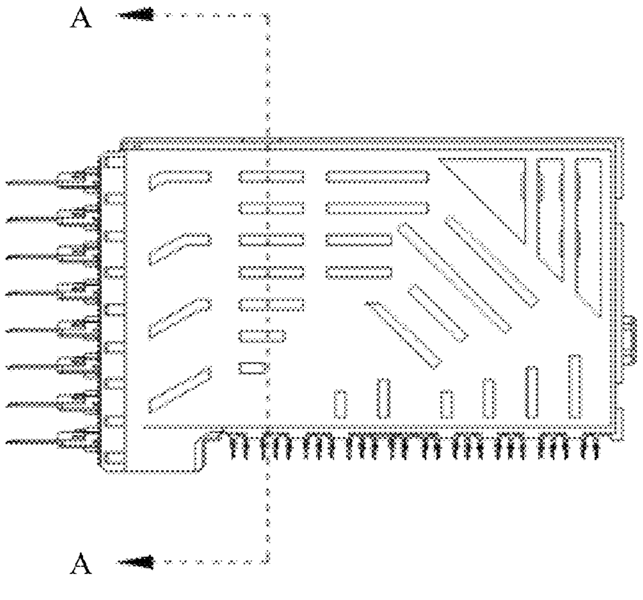
FIG. 6 is a schematic diagram of an assembly structure of a differential pair module of the connector in FIG. 4.

As shown in FIG. 4 to FIG. 6, in a first embodiment, the connector 23 may include an assembling bracket 232 and several differential pair modules 231.

As shown in FIG. 5, the assembling bracket 232 is in a shape of a flat plate and is provided with several first through holes 232*a* and several second through holes 232*b*. The first through holes 232*a* and the second through holes 232*b* all penetrate through the assembling bracket 232 along a thickness direction of the assembling bracket 232. The first through hole 232*a* may be greater than the second through hole 232*b*. The first through holes 232*a* and the second through holes 232*b* are spaced from each other to form a matrix. In a row (or column) direction of the matrix, the first through holes 232*a* and the second through holes 232*b* are alternately arranged at intervals. In a column (or row) direction of the matrix, several first through holes 232*a* are sequentially arranged at intervals to form a row, and several second through holes 232*b* are sequentially arranged at intervals to form a row.

The assembling bracket 232 is configured to assemble all the differential pair modules 231 together, and serves as a common ground for all the differential pair modules 231. Specifically, the differential pair modules 231 are consecutively stacked, and the assembling bracket 232 is disposed on a same side surface of all the differential pair modules 231. One first signal tail part and one second signal tail part (described below) of each differential pair module 231 thread through one first through hole 232*a* correspondingly and are spaced from a hole wall of the first through hole 232*a*. One first ground part and one second ground part (described below) of each differential pair module 231 separately thread through one second through hole 232*b* correspondingly and come into contact with a hole wall of the second through hole 232*b*, so that the differential pair module 231 is connected to the common ground.

Figure 7:
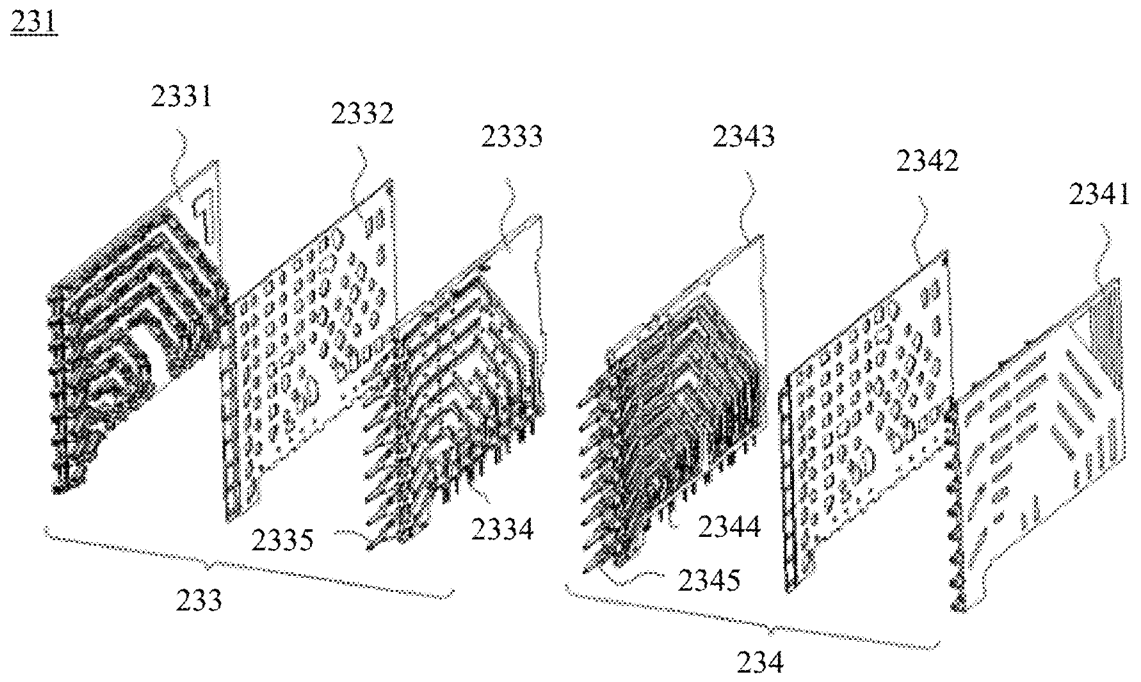
FIG. 7 is a schematic diagram of an exploded structure of the differential pair module in FIG. 6.

As shown in FIG. 7, the differential pair module 231 may include a first submodule 233 and a second submodule 234, and the first submodule 233 and the second submodule 234 are stacked and assembled as a whole. The differential pair module 231 is configured to transmit a differential signal. The first submodule 233 is configured to transmit one signal of the differential signal, and the second submodule 234 is configured to transmit the other signal of the differential signal.

As shown in FIG. 7 to FIG. 10, the first submodule 233 includes a first shielding bracket 2331, a first shielding member 2332, a first terminal bearing member 2333, a first signal terminal 2335, and a first ground terminal 2334.

Figure 9:
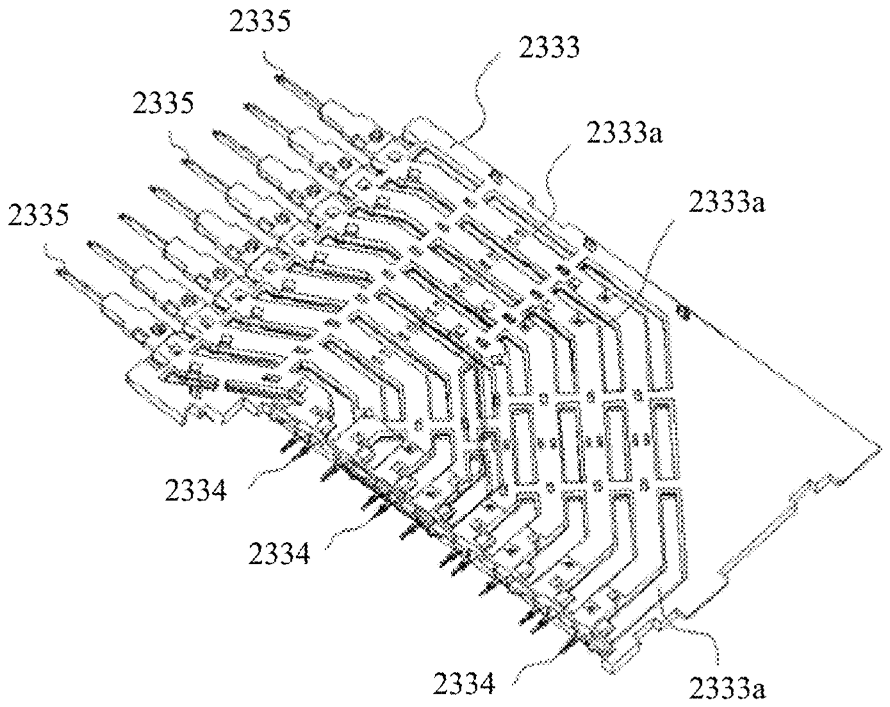
FIG. 9 is a schematic diagram of a structure of a first terminal bearing member that bears first signal terminals and first ground terminals and that is in the first submodule in FIG. 8.

As shown in FIG. 9, the first terminal bearing member 2333 is configured to bear and protect first signal terminals 2335 and first ground terminals 2334. The first terminal bearing member 2333 may be a plate-shaped plastic part, and may be provided with a plurality of rows of first limiting through holes 2333*a* spaced from each other. A plurality of first limiting through holes 2333*a* spaced from each other may be included in each row. Each first limiting through hole 2333*a* may penetrate through the first terminal bearing member 2333 along a thickness direction of the first terminal bearing member 2333. The first limiting through hole 2333*a* is configured to be fitted with the first shielding bracket (described below).

The first terminal bearing member 2333, the first signal terminals 2335, and the first ground terminals 2334 may be connected as a whole by using an in-mold injection molding process. Through in-mold injection molding, plastics attached to the first signal terminals 2335 and the first ground terminals 2334 can form the first terminal bearing member 2333, and the first limiting through holes 2333*a* are formed in the first terminal bearing member 2333. Certainly, the first signal terminals 2335 and the first ground terminals 2334 may alternatively be mounted on the first terminal bearing member 2333 by using another process.

Figure 10:
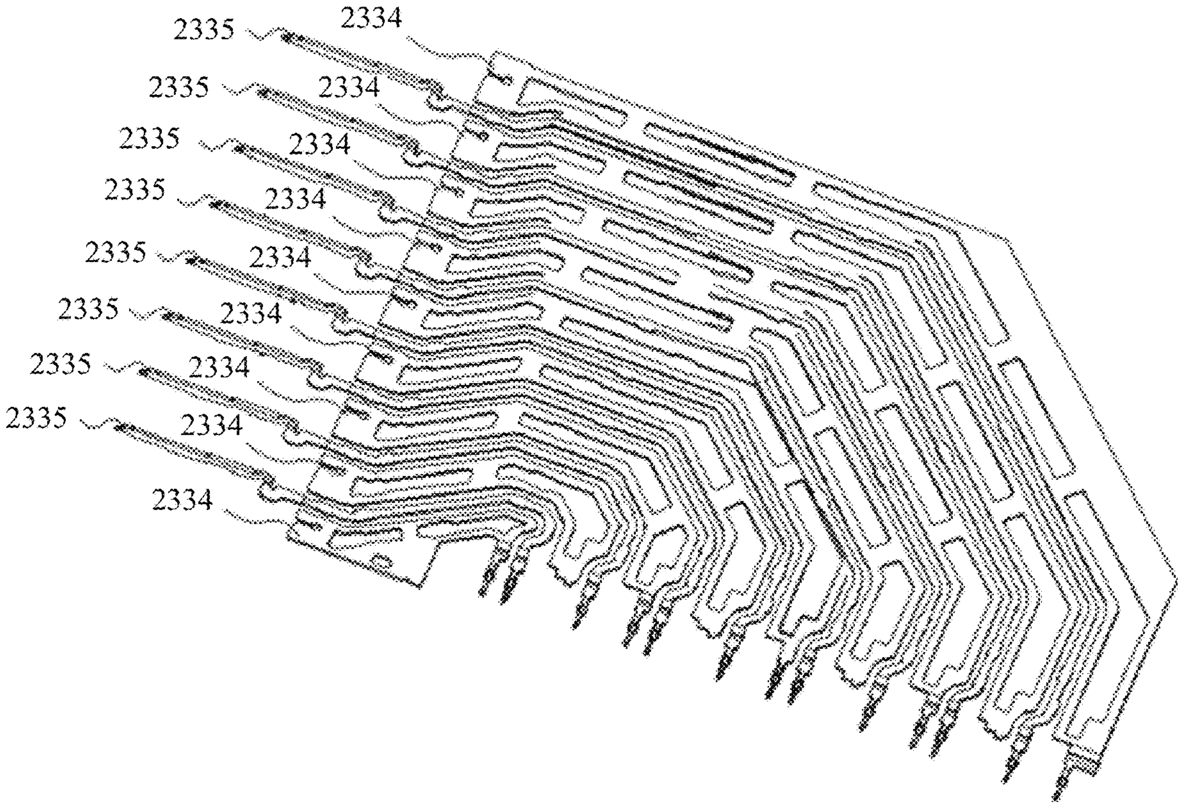
FIG. 10 is a schematic diagram of an arrangement structure of the first signal terminals and the first ground terminals in FIG. 9.

As shown in FIG. 9 and FIG. 10, on the first terminal bearing member 2333, a plurality of first signal terminals 2335 and a plurality of first ground terminals 2334 are alternately arranged at intervals. To be specific, one first ground terminal 2334 is disposed between two adjacent first signal terminals 2335, and one first signal terminal 2335 is disposed between two adjacent first ground terminals 2334. In addition, one first signal terminal 2335 is located between every two adjacent rows of first limiting through holes 2333*a*.

In another embodiment, a quantity and an arrangement manner of the first limiting through hole 2333*a* may be set depending on a requirement. For example, there is at least one first limiting through hole 2333*a*. The first limiting through hole 2333*a* may be disposed at a required location without being arranged in rows regularly. Alternatively, the first limiting through hole 2333*a* may not be disposed.

Figure 11:
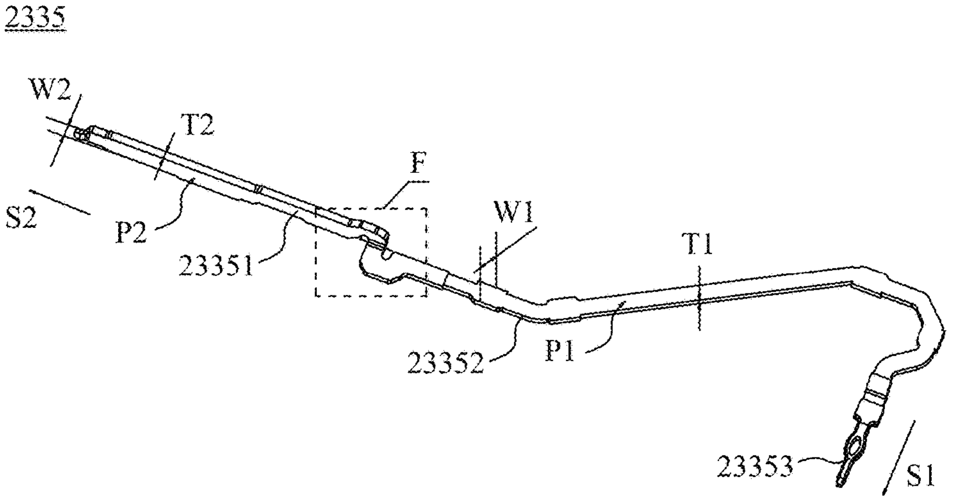
FIG. 11 is a schematic diagram of a structure of the first signal terminal in FIG. 10.

As shown in FIG. 11, the first signal terminal 2335 may roughly be in a shape of a narrow sheet. The first signal terminal 2335 may include a first signal conductive connection part 23351, a first signal body part 23352, and a first signal tail part 23353. The first signal body part 23352 is connected between the first signal conductive connection part 23351 and the first signal tail part 23353. The first signal conductive connection part 23351 is configured to be inserted into the second PCB board connector 24, and the first signal tail part 23353 is configured to be inserted into the first PCB board 22.

As shown in FIG. 11, the first signal body part 23352 may be in a shape of a narrow sheet (a thickness T1 of the first signal body part 23352 is less than a width W1 of the first signal body part 23352), and a thickness direction of the first signal body part 23352 may be consistent with the thickness direction of the first terminal bearing member 2333. The first signal body part 23352 has an extension plane P1, and a normal line of the extension plane P1 is along the thickness direction of the first signal body part 23352. A most portion of the first signal body part 23352 is embedded in the first terminal bearing member 2333, and a small portion of the first signal body part 23352 may protrude from the first terminal bearing member 2333 for a relatively short distance, so that the first signal conductive connection part 23351 is located outside the first terminal bearing member 2333. Certainly, the first signal body part 23352 may alternatively be disposed entirely inside the first terminal bearing member 2333, so that the first signal conductive connection part 23351 is located outside the first terminal bearing member 2333 and is adjacent to the first terminal bearing member 2333.

As shown in FIG. 11, the first signal body part 23352 may have a bent shape, so that an extension direction S2 of the first signal conductive connection part 23351 and an extension direction S1 of the first signal tail part 23353 form an included angle. The included angle may be a right angle or a non-right angle. The extension direction S2 of the first signal conductive connection part 23351 is a direction in which the first signal conductive connection part 23351 is inserted into the second PCB board connector 24, and the extension direction S1 is parallel to the extension plane P1. The extension direction S1 of the first signal tail part 23353 is a direction in which the first signal tail part 23353 is inserted into the first PCB board 22, and the extension direction S2 is parallel to the extension plane P1. Refer to FIG. 3. By using the included-angle formation design, the first signal terminal 2335 is conveniently connected between the second PCB board connector 24 and the first PCB board 22 whose side surfaces are opposite to each other.

Figure 12:
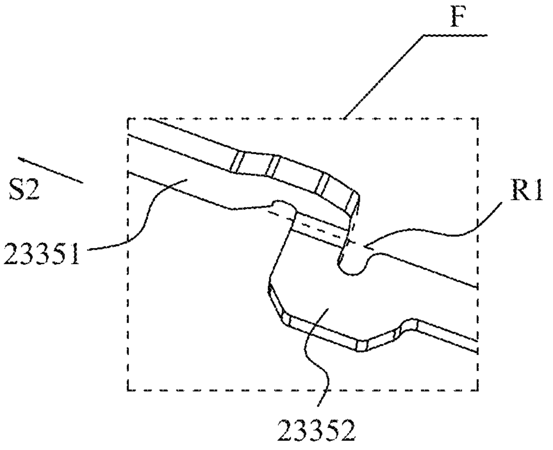
FIG. 12 is a schematic diagram of a partially enlarged structure of a location F in FIG. 11.

As shown in FIG. 11, the first signal conductive connection part 23351 may be in a shape of a narrow sheet (a thickness T2 of the first signal conductive connection part 23351 is less than a width W2 of the first signal conductive connection part 23351). The first signal conductive connection part 23351 has an extension plane P2, and a normal direction of the extension plane P2 is a dimension direction of the thickness T2, that is, a thickness direction of the first signal conductive connection part 23351. The extension plane P2 and the extension plane P1 are connected and form a right angle. In this way, the first signal conductive connection part 23351 and the first signal body part 23352 form a vertical bending structure. With reference to FIG. 11 and FIG. 12, a bending line R1 between the first signal conductive connection part 23351 and the first signal body part 23352 is along the extension direction S2 of the first signal conductive connection part 23351. The bending line R1 passes through an arc transition region between the first signal conductive connection part 23351 and the first signal body part 23352 and serves as a symmetry axis of the arc transition region.

The vertical bending connection structure may be implemented, for example, by using a sheet metal processing technique. Punching or cutting is performed to obtain the first signal conductive connection part 23351 and the first signal body part 23352 that are coplanar with each other. The bending line R1 is determined between the first signal conductive connection part 23351 and the first signal body part 23352 based on the extension direction S2 of the first signal conductive connection part 23351, and then the first signal conductive connection part 23351 is vertically bent relative to the first signal body part 23352 along the bending line R1 by using a bending process. The first signal conductive connection part 23351 may be bent towards one side of the first signal body part 23352, or may be bent towards an opposite side (the one side and the other side are two sides in the thickness direction of the first signal body part 23352).

In another embodiment, a bending angle between the first signal conductive connection part 23351 and the first signal body part 23352 may be an acute angle or an obtuse angle. In other words, the included angle formed by the extension plane P2 and the extension plane P1 may be an acute angle or an obtuse angle, and/or the extension direction S2 of the first signal conductive connection part 23351 may not be parallel to the extension plane P1 of the first signal body part 23352.

As shown in FIG. 11, to ensure insertion strength and signal transmission quality, the first signal tail part 23353 may include a fisheye structure. Certainly, the fisheye structure is not mandatory. With reference to FIG. 5, the first signal tail part 23353 may thread through a first through hole 232*a* of the assembling bracket 232 and is spaced from a hole wall of the first through hole 232*a*.

Figure 13:
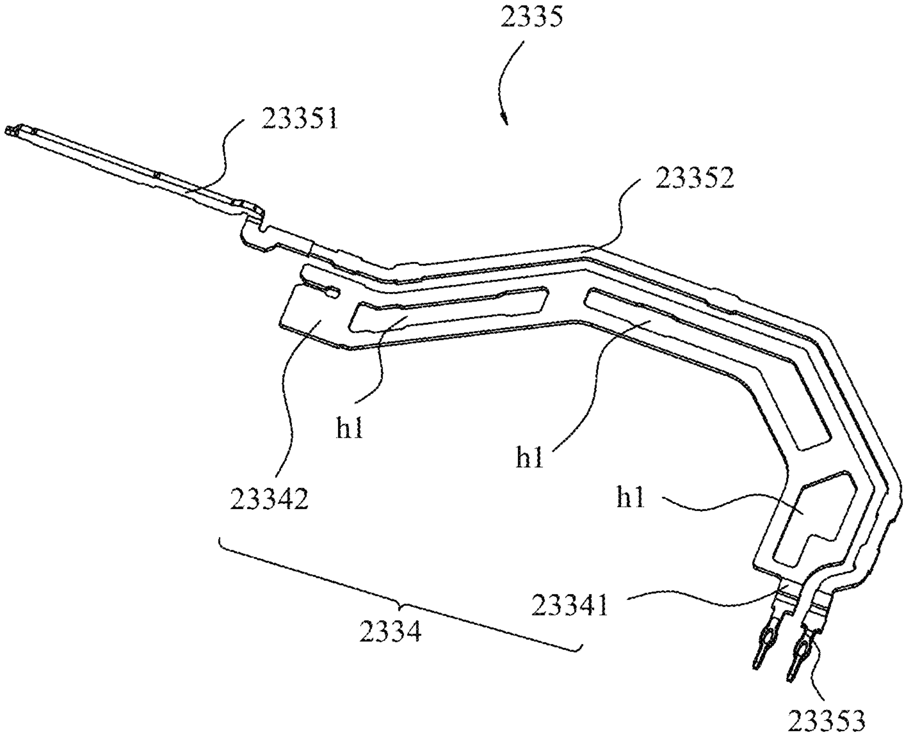
FIG. 13 is a schematic diagram illustrating the structure of the first ground terminal in FIG. 10 and an arrangement relationship between the first ground terminal and the first signal terminal.

As shown in FIG. 10 and FIG. 13, the first ground terminal 2334 is spaced adjacent to the first signal terminal 2335. The first ground terminal 2334 may include a first ground body part 23342 and a first ground part 23341 that are connected to each other. With reference to FIG. 13 and FIG. 9, the first ground body part 23342 is embedded in the first terminal bearing member 2333, and the first ground body part 23342 is spaced adjacent to the first signal body part 23352. The first ground part 23341 is exposed outside the first terminal bearing member 2333, and the first ground part 23341 is spaced adjacent to the first signal tail part 23353. The first ground part 23341 and the first signal tail part 23353 are located on a same side of the first terminal bearing member 2333, that is, the first ground part 23341 and the first signal tail part 23353 are located on a same side of the first signal body part 23352. The first ground body part 23342 is configured to be electrically connected to a ground terminal in the second PCB board connector 24, and the first ground part 23341 is configured to be grounded.

As shown in FIG. 13, the first ground body part 23342 may be in a shape of a narrow sheet, and a thickness direction of the first ground body part 23342 is basically consistent with the thickness direction of the first terminal bearing member 2333. Several first fitting through holes h1 spaced from each other may be disposed in the first ground body part 23342, and the first fitting through holes h1 penetrate through the first ground body part 23342 along the thickness direction of the first ground body part 23342. The first fitting through holes h1 in the first ground body part 23342 are in a one-to-one correspondence with a row of first limiting through holes 2333*a* in the first terminal bearing member 2333. A single first fitting through hole h1 at least partially overlaps a first limiting through hole 2333*a* corresponding to the first fitting through hole h1. For example, orthographic projections of the two through holes along axis directions of the holes completely overlap each other, or one projection falls within a boundary of the other projection, or two projections partially overlap each other. The first fitting through hole h1 is also configured to be fitted with the first shielding bracket (described below).

With reference to FIG. 5 and FIG. 13, the first ground part 23341 may thread through a second through hole 232*b* of the assembling bracket 232 and come into contact with a hole wall of the second through hole 232*b* to implement grounding. The first ground part 23341 may further form a fisheye structure, to be conveniently inserted into the first PCB board 22 and connected to a ground of the first PCB board 22. The fisheye structure can desirably ensure insertion strength and signal transmission quality. Certainly, the first ground part 23341 may alternatively not need to include a fisheye structure. In another embodiment, the structure and connection manner of the first ground terminal 2334 are not limited to those described above, and the first ground terminal 2334 may not even need to be disposed.

Figure 8:
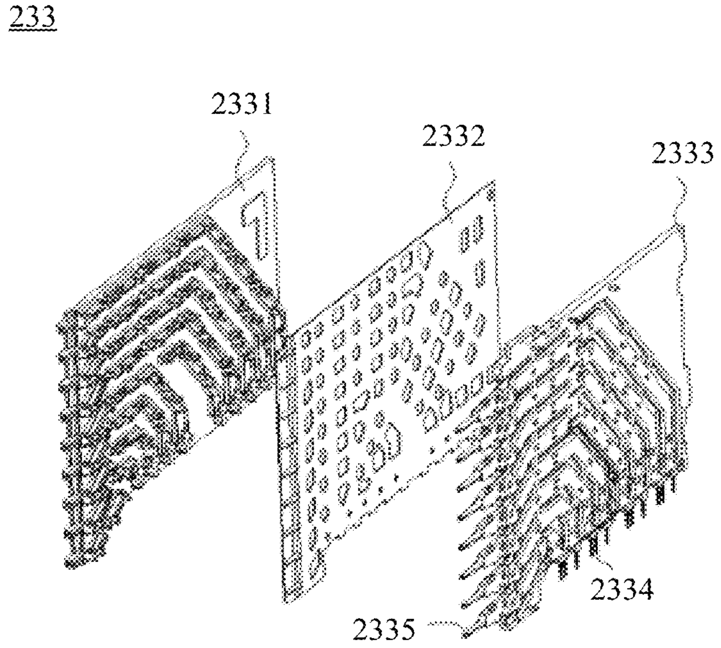
FIG. 8 is a schematic diagram of an exploded structure of a first submodule of the differential pair module in FIG. 7.
Figure 14:
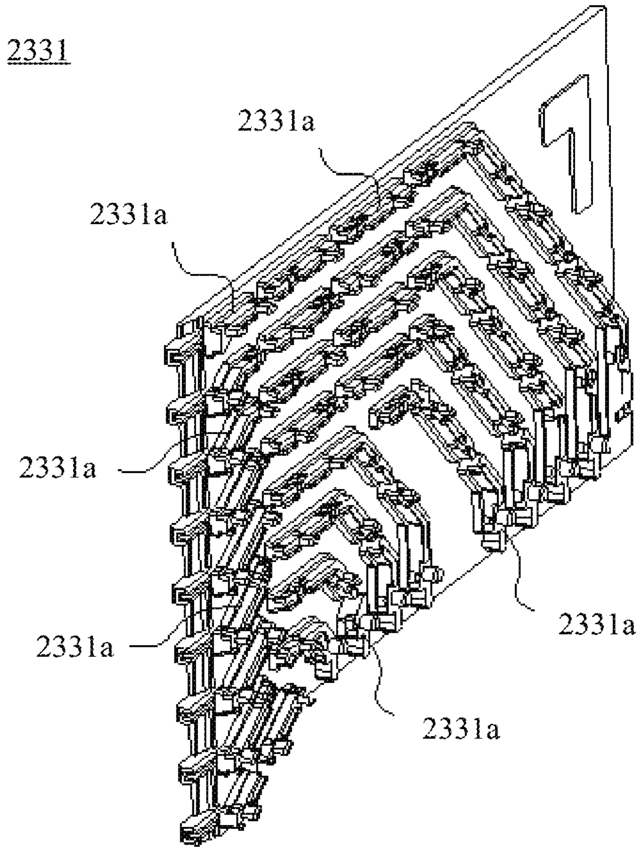
FIG. 14 is a schematic diagram of a structure of a first shielding bracket of the first submodule in FIG. 8.
Figure 15:
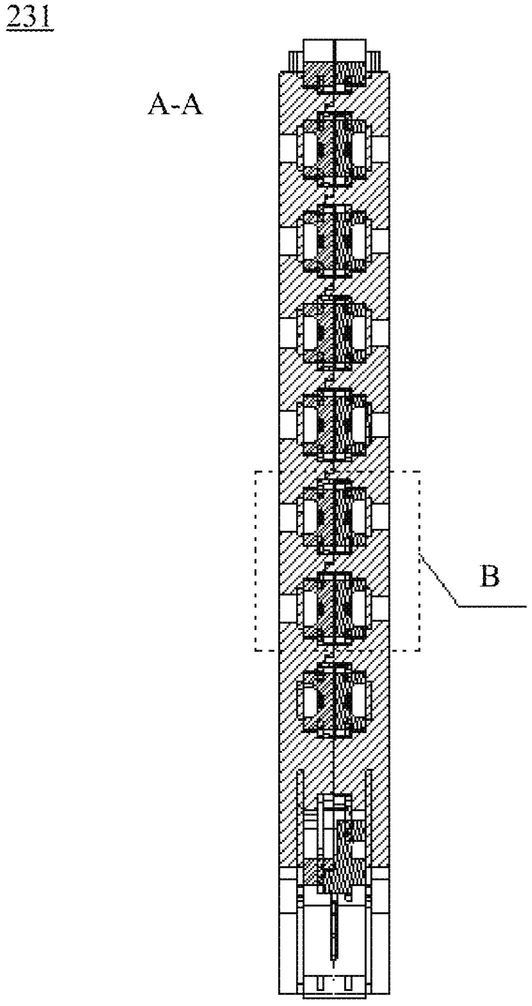
FIG. 15 is a schematic diagram of a cross-sectional structure of A-A in FIG. 6.

As shown in FIG. 8 and FIG. 14, the first shielding bracket 2331 is approximately plate-shaped, and covers and is connected to the first terminal bearing member 2333. A thickness direction of the first shielding bracket 2331 is basically consistent with that of the first terminal bearing member 2333. The first shielding bracket 2331 is further configured to mount and bear the first shielding member 2332. The first shielding bracket 2331 may be a plastic part, and may be molded by using an injection molding process.

As shown in FIG. 14, a surface of the first shielding bracket 2331 may form a plurality of rows of limiting protrusions 2331*a* that are spaced from each other, and a plurality of limiting protrusions 2331*a* arranged at intervals may be included in each row. A channel is formed between every two adjacent rows of limiting protrusions 2331*a*. With reference to FIG. 14 and FIG. 9, one limiting protrusion 2331*a* is correspondingly inserted into one second fitting through hole h1 in the first ground body part 23342 and one first limiting through hole 2333*a* in the first terminal bearing member 2333, and fits with the first fitting through hole h1 and the first limiting through hole 2333*a*. The first shielding bracket 2331 and the first terminal bearing member 2333 can be assembled together by fitting the limiting protrusion 2331*a* with the first fitting through hole h1 and the first limiting through hole 2333*a*. In addition, one first signal terminal 2335 is correspondingly accommodated in one channel, and two adjacent first signal terminals 2335 are separated by a row of limiting protrusions 2331*a*. This can reduce crosstalk between adjacent first signal terminals 2335.

In another embodiment, a specific quantity and an arrangement manner of the limiting protrusion 2331*a* may be set depending on a requirement, provided that the limiting protrusion 2331*a* can be fitted with at least some first fitting through holes h1 and at least some first limiting through holes 2333*a*. For example, several limiting protrusions 2331*a* form a plurality of rows, and there may be only one limiting protrusion 2331*a* in each row. Alternatively, several limiting protrusions 2331*a* may be arranged in a row, and a plurality of limiting protrusions 2331*a* spaced from each other are included in a single row of limiting protrusions 2331*a*. Alternatively, the first shielding bracket 2331 may not be provided with a limiting protrusion 2331*a*. The foregoing structure of the first shielding bracket 2331 is not mandatory. For example, the first shielding bracket 2331 may not be plate-shaped, may not be provided with a limiting protrusion 2331*a*, or even may be canceled.

As shown in FIG. 8, the first shielding member 2332 may be a sheet-shaped metal piece, and the first shielding member 2332 may be partially hollowed out to form a first hollowed-out region. The first shielding member 2332 is disposed on a side that is of the first shielding bracket 2331 and that faces the first terminal bearing member 2333. The limiting protrusion 2331*a* passes through the first hollowed-out region of the first shielding member 2332, and a protrusion height of the limiting protrusion 2331*a* may be greater than a thickness of the first shielding member 2332. The first shielding member 2332 may be nested at the root of the limiting protrusion 2331*a*. The first shielding member 2332 is located between the first shielding bracket 2331 and the first terminal bearing member 2333. The first shielding member 2332 serves as a reference ground when the first signal terminal 2335 performs signal transmission, and has an electromagnetic shielding function. In this implementation, the first shielding member 2332 fills spacings between the limiting protrusions 2331*a*. The spacings include a spacing between two adjacent rows of limiting protrusions 2331*a* and a spacing between two adjacent limiting protrusions 2331*a* in a single row of limiting protrusions 2331*a*. This can enhance isolation between two adjacent first signal terminals 2335, and further reduce crosstalk between the two adjacent first signal terminals 2335.

The first shielding member 2332 and the first shielding bracket 2331 may form an integrated structure. A surface of the first shielding member 2332 may be coated with plastics by using an in-mold injection molding process, to form the integrated structure including the first shielding bracket 2331 and the first shielding member 2332. This integrated structure has high processing precision, and reduces a quantity of components that need to be assembled in the first submodule 233, thereby improving assembly precision and ensuring electromagnetic shielding stability. In addition, the first shielding member 2332 and the first shielding bracket 2331 are integrally formed through in-mold injection molding, without a need to first obtain the first shielding bracket 2331 through injection molding and then assemble the first shielding bracket 2331 and the first shielding member 2332 together, so that costs can be reduced.

To ensure an electromagnetic shielding effect, electroplating processing may be performed on the integrated structure formed by the first shielding member 2332 and the first shielding bracket 2331, and both the surface of the first shielding member 2332 and the surface of the first shielding bracket 2331 form a conducting layer. The conducting layers may alternatively be formed by using another process.

In another embodiment, the first shielding member 2332 and the first shielding bracket 2331 may be separately designed, and then the first shielding member 2332 and the first shielding bracket 2331 may be assembled. In this manner, several fitting through holes may be disposed on the first shielding member 2332, and the limiting protrusions 2331*a* on the first shielding bracket 2331 pass through the fitting through holes. A quantity of the fitting through hole adapts to a quantity, a shape, and a location of the limiting protrusion 2331*a*. This fitting manner can also increase a contact area between the first shielding member 2332 and the first shielding bracket 2331, thereby improving an electromagnetic shielding effect. Likewise, to improve the electromagnetic shielding effect, the conducting layers may be formed on the surface of the first shielding member 2332 and the surface of the first shielding bracket 2331. Processes used for forming the conducting layers are not limited to electroplating.

As shown in FIG. 6, FIG. 15, FIG. 16, and FIG. 8, a surface that is of the first terminal bearing member 2333 and that faces the first shielding member 2332 and corresponds to the first signal body part 23352 is provided with an opening 2333*b*. The "correspondence" between the opening 2333*b* and the first signal body part 23352 means that the opening 2333*b* is located in the vicinity of the first signal body part 23352, for example, in the thickness direction of the first signal body part 23352. The opening 2333*b* may fall within a boundary of the first signal body part 23352, or the opening 2333*b* may overlap the boundary portion of the first signal body part 23352, or the first signal body part 23352 may fall within a boundary of the opening 2333*b*. A shape, a size, and a quantity of the opening 2333*b* may be set depending on a requirement. For example, an opening 2333*b* may be formed corresponding to a location of each first signal body part 23352. When there are a plurality of openings 2333*b*, the openings 2333*b* are spaced from each other.

The opening 2333*b* may be obtained by hollowing out a material that is of the first terminal bearing member 2333 and that covers the first signal body part 23352, and the first signal body part 23352 is exposed from the opening 2333*b* and is spaced opposite to the first shielding member 2332.

Impedance and signal attenuation of the first signal terminal 2335 can be adjusted by disposing the opening 2333*b*. Depending on a product requirement, when the impedance needs to be increased, an opening 2333*b* with a larger size may be disposed to make an opening area of the opening 2333*b* larger; otherwise, an opening 2333*b* with a smaller size may be disposed to make an opening area of the opening 2333*b* smaller. To reduce signal attenuation, an opening 2333*b* with a larger size may be disposed to make an opening area of the opening 2333*b* larger. In another embodiment, the opening 2333*b* may not be disposed.

In this implementation, a structure of the second submodule 234 is similar to that of the first submodule 233, and is detailed below.

Figure 16:
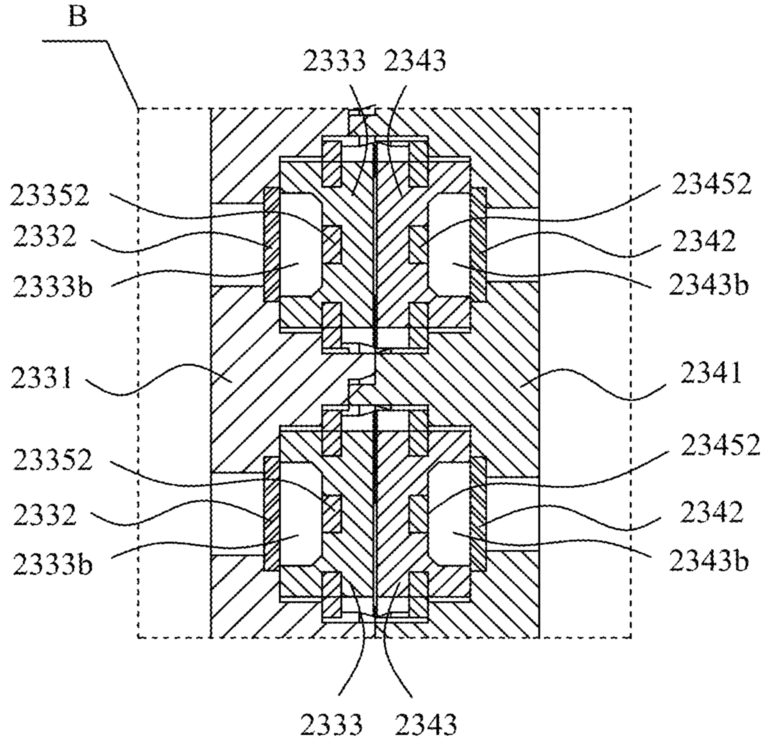
FIG. 16 is a schematic diagram of a partially enlarged structure of a location B in FIG. 15.
Figure 17:
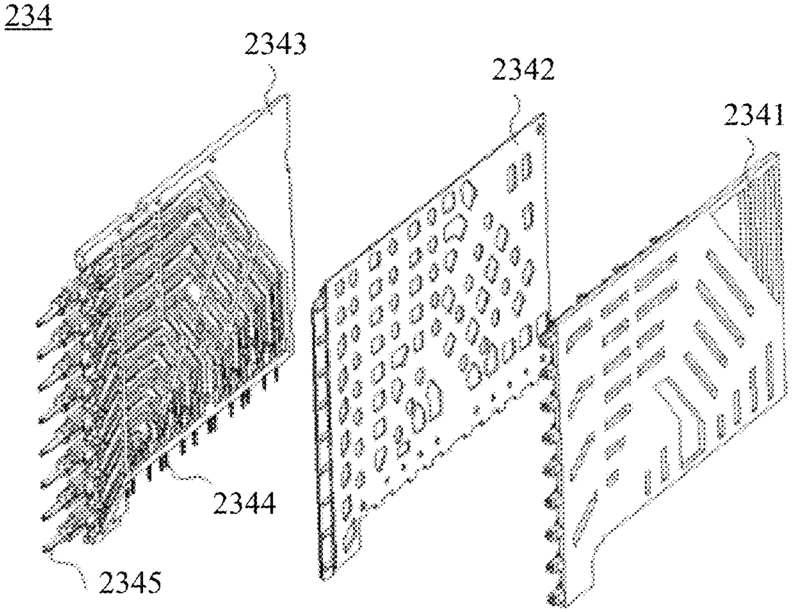
FIG. 17 is a schematic diagram of an exploded structure of a second submodule of the differential pair module in FIG. 7.
Figure 18:
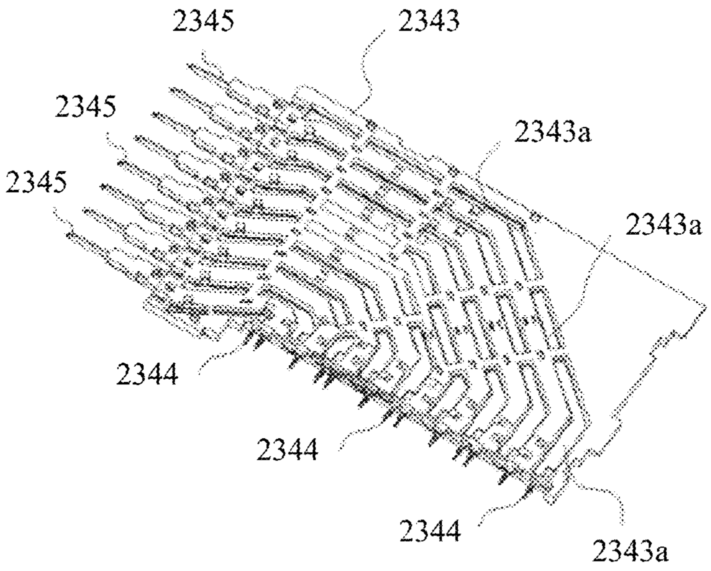
FIG. 18 is a schematic diagram of a structure of a second terminal bearing member that bears second signal terminals and second ground terminals and that is in FIG. 17.

As shown in FIG. 16 to FIG. 18, the second submodule 234 includes a second terminal bearing member 2343, a second signal terminal 2345, a second ground terminal 2344, a second shielding bracket 2341, and a second shielding member 2342.

As shown in FIG. 17 and FIG. 18, the second terminal bearing member 2343 is configured to bear and protect second signal terminals 2345 and second ground terminals 2344. The second terminal bearing member 2343 may be a plate-shaped plastic part, and may be provided with a plurality of rows of second limiting through holes 2343*a* that are spaced from each other. A plurality of second limiting through holes 2343*a* spaced from each other may be included in each row. Each second limiting through hole 2343*a* may penetrate through the second terminal bearing member 2343 along a thickness direction. The second limiting through hole 2343*a* is configured to be fitted with the second shielding bracket (described below).

The second terminal bearing member 2343, the second signal terminals 2345, and the second ground terminals 2344 may be connected as a whole by using an in-mold injection molding process. Through in-mold injection molding, plastics attached to the second signal terminals 2345 and the second ground terminals 2344 can form the second terminal bearing member 2343, and the second limiting through holes 2343*a* are formed in the second terminal bearing member 2343. Certainly, the second signal terminals 2345 and the second ground terminals 2344 may alternatively be mounted on the second terminal bearing member 2343 by using another process.

Figure 19:
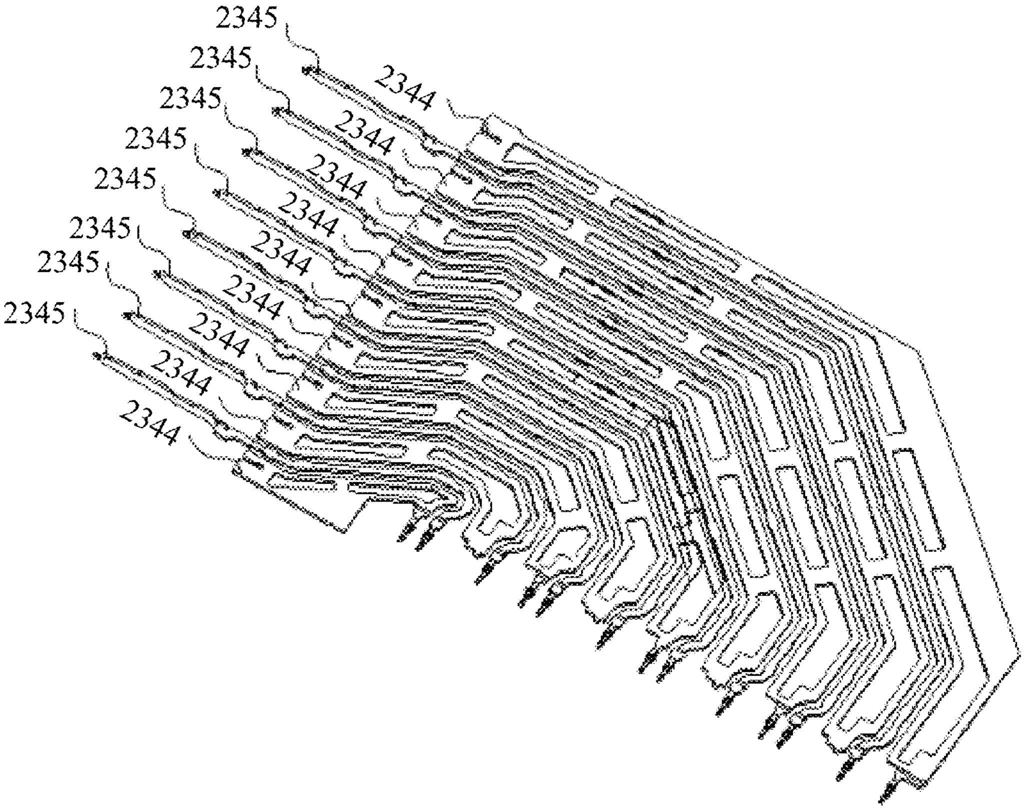
FIG. 19 is a schematic diagram of an arrangement structure of the second signal terminals and the second ground terminals in FIG. 18.

As shown in FIG. 18 and FIG. 19, on the second terminal bearing member 2343, there may be a plurality of second signal terminals 2345 and a plurality of second ground terminals 2344, and the plurality of second signal terminals 2345 and the plurality of second ground terminals 2344 are alternately arranged at intervals. To be specific, one second ground terminal 2344 is disposed between two adjacent second signal terminals 2345, and one second signal terminal 2345 is disposed between two adjacent second ground terminals 2344.

In another embodiment, a quantity and an arrangement manner of the second limiting through hole 2343*a* may be set depending on a requirement. For example, there is at least one second limiting through hole 2343*a*. The second limiting through hole 2343*a* may be disposed at a required location without being arranged in rows regularly. Alternatively, the second limiting through hole 2343*a* may not be disposed.

Figure 20:
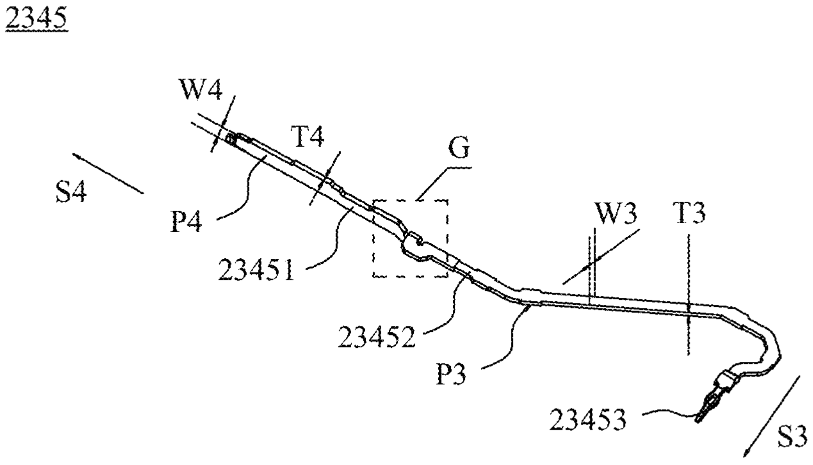
FIG. 20 is a schematic diagram of a structure of the second signal terminal in FIG. 19.

As shown in FIG. 20, the second signal terminal 2345 may roughly be in a shape of a narrow sheet. The second signal terminal 2345 may include a second signal conductive connection part 23451, a second signal body part 23452, and a second signal tail part 23453. The second signal body part 23452 is connected between the second signal conductive connection part 23451 and the second signal tail part 23453. The second signal conductive connection part 23451 is configured to be inserted into the second PCB board connector 24, and the second signal tail part 23453 is configured to be inserted into the first PCB board 22.

As shown in FIG. 20, the second signal body part 23452 may be in a shape of a narrow sheet (a thickness T3 of the second signal body part 23452 is less than a width W3 of the second signal body part 23452), and a thickness direction of the second signal body part 23452 may be basically consistent with the thickness direction of the second terminal bearing member 2343. The second signal body part 23452 has an extension plane P3 (a surface that is of the second signal body part 23452 and that faces downwards at a viewing angle in FIG. 20), and a normal line of the extension plane P3 is along the thickness direction of the second signal body part 23452. A most portion of the second signal body part 23452 is embedded in the second terminal bearing member 2343, and a small portion of the second signal body part 23452 may protrude from the second terminal bearing member 2343 for a relatively short distance, so that the second signal conductive connection part 23451 is located outside the second terminal bearing member 2343. Certainly, the second signal body part 23452 may alternatively be disposed entirely inside the second terminal bearing member 2343, so that the second signal conductive connection part 23451 is located outside the second terminal bearing member 2343 and is adjacent to the second terminal bearing member 2343.

As shown in FIG. 20, the second signal body part 23452 may have a bent shape, so that an extension direction S4 of the second signal conductive connection part 23451 and an extension direction S3 of the second signal tail part 23453 form an included angle. The included angle may be a right angle or a non-right angle. The extension direction S4 of the second signal conductive connection part 23451 is a direction in which the second signal conductive connection part 23451 is inserted into the second PCB board connector 24, and the extension direction S4 is parallel to the extension plane P3. The extension direction S3 of the second signal tail part 23453 is a direction in which the second signal tail part 23453 is inserted into the first PCB board 22, and the extension direction S3 is parallel to the extension plane P3. Refer to FIG. 3. By using the included-angle formation design, the second signal terminal 2345 is conveniently connected between the second PCB board connector 24 and the first PCB board 22 whose side surfaces are opposite to each other.

Figure 21:
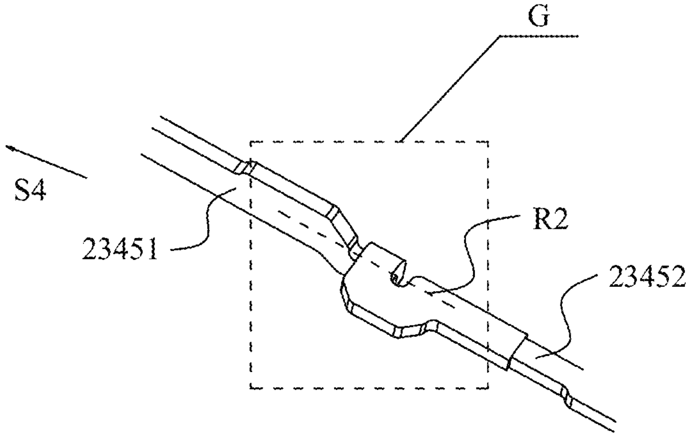
FIG. 21 is a schematic diagram of a partially enlarged structure of a location G in FIG. 20.

As shown in FIG. 20, the second signal conductive connection part 23451 may be in a shape of a narrow sheet (a thickness T4 of the second signal conductive connection part 23451 is less than a width W4 of the second signal conductive connection part 23451). The second signal conductive connection part 23451 has an extension plane P4, and a normal direction of the extension plane P4 is a dimension direction of the thickness T4, that is, a thickness direction of the second signal conductive connection part 23451. The extension plane P4 and the extension plane P3 are connected and form a right angle. In this way, the second signal conductive connection part 23451 and the second signal body part 23452 form a vertical bending structure. With reference to FIG. 20 and FIG. 21, a bending line R2 between the second signal conductive connection part 23451 and the second signal body part 23452 is along the extension direction S4 of the second signal conductive connection part 23451. The bending line R2 passes through an arc transition region between the second signal conductive connection part 23451 and the second signal body part 23452 and serves as a symmetry axis of the arc transition region.

The vertical bending connection structure may be implemented, for example, by using a sheet metal processing technique. Punching or cutting is performed to obtain the second signal conductive connection part 23451 and the second signal body part 23452 that are coplanar with each other. The bending line R2 is determined between the second signal conductive connection part 23451 and the second signal body part 23452 based on the extension direction S4 of the second signal conductive connection part 23451, and then the second signal conductive connection part 23451 is vertically bent relative to the second signal body part 23452 along the bending line R2 by using a bending process. The second signal conductive connection part 23451 may be bent towards one side of the second signal body part 23452, or may be bent towards an opposite side (the one side and the other side are two sides in the thickness direction of the second signal body part 23452).

With reference to FIG. 20 and FIG. 11, considering that in the differential pair module 231, the second signal conductive connection part 23451 and the first signal conductive connection part 23351 are spaced opposite to each other and a spacing between them is limited, the second signal conductive connection part 23451 and the first signal conductive connection part 23351 may be bent backwards, that is, both of them are bent in a direction facing away from each other.

In another embodiment, a bending angle between the second signal conductive connection part 23451 and the second signal body part 23452 may be an acute angle or an obtuse angle. In other words, the included angle formed by the extension plane P4 and the extension plane P3 may be an acute angle or an obtuse angle, and/or the extension direction S4 of the second signal conductive connection part 23451 may not be parallel to the extension plane P3 of the second signal body part 23452.

As shown in FIG. 20, to ensure insertion strength and signal transmission quality, the second signal tail part 23453 may include a fisheye structure. Certainly, the fisheye structure is not mandatory. With reference to FIG. 5, the second signal tail part 23453 may thread through a first through hole 232*a* of the assembling bracket 232 and is spaced from a hole wall of the first through hole 232*a*.

Figure 22:
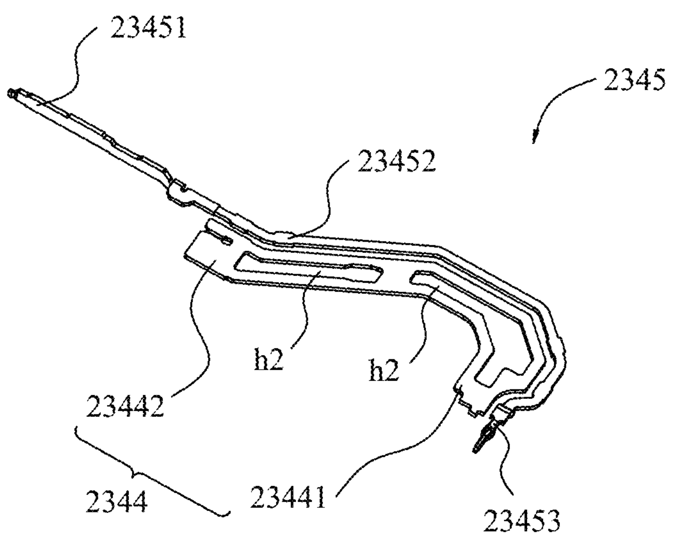
FIG. 22 is a schematic diagram illustrating the structure of the second ground terminal in FIG. 19 and an arrangement relationship between the second ground terminal and the second signal terminal.

As shown in FIG. 19 and FIG. 22, the second ground terminal 2344 is spaced adjacent to the second signal terminal 2345. The second ground terminal 2344 may include a second ground body part 23442 and a second ground part 23441 that are connected to each other. With reference to FIG. 22 and FIG. 18, the second ground body part 23442 is embedded in the second terminal bearing member 2343, and the second ground body part 23442 is spaced adjacent to the second signal body part 23452. The second ground part 23441 is exposed outside the second terminal bearing member 2343, and is spaced adjacent to the second signal tail part 23453. The second ground part 23441 and the second signal tail part 23453 are located on a same side of the second terminal bearing member 2343, that is, the second ground part 23441 and the second signal tail part 23453 are located on a same side of the second signal body part 23452. The second ground body part 23442 is configured to be electrically connected to a ground terminal in the second PCB board connector 24, and the second ground part 23441 is configured to be grounded.

As shown in FIG. 22, the second ground body part 23442 may be in a shape of a narrow sheet, and a thickness direction of the second ground body part 23442 is basically consistent with the thickness direction of the second terminal bearing member 2343. Several second fitting through holes h2 spaced from each other may be disposed in the second ground body part 23442, and the second fitting through holes h2 penetrate through the second ground body part 23442 along the thickness direction of the second ground body part 23442. The second fitting through holes h2 in the second ground body part 23442 are in a one-to-one correspondence with a row of second limiting through holes 2343*a* in the second terminal bearing member 2343. A single second fitting through hole h2 at least partially overlaps a second limiting through hole 2343*a* corresponding to the second fitting through hole h2. For example, orthographic projections of the two through holes along axis directions of the holes completely overlap each other, or one projection falls within a boundary of the other projection, or two projections partially overlap each other. The second fitting through hole h2 is also configured to be fitted with the second shielding bracket (described below).

With reference to FIG. 5 and FIG. 22, the second ground part 23441 may thread through a second through hole 232*b* of the assembling bracket 232 and come into contact with a hole wall of the second through hole 232*b* to implement grounding. The second ground part 23441 may further form a fisheye structure, to be conveniently inserted into the first PCB board 22 and connected to a ground of the first PCB board 22. The fisheye structure can desirably ensure insertion strength and signal transmission quality. Certainly, the second ground part 23441 may alternatively not need to include a fisheye structure. In another embodiment, the structure and connection manner of the second ground terminal 2344 are not limited to those described above, and the second ground terminal 2344 may not even need to be disposed.

Figure 23:
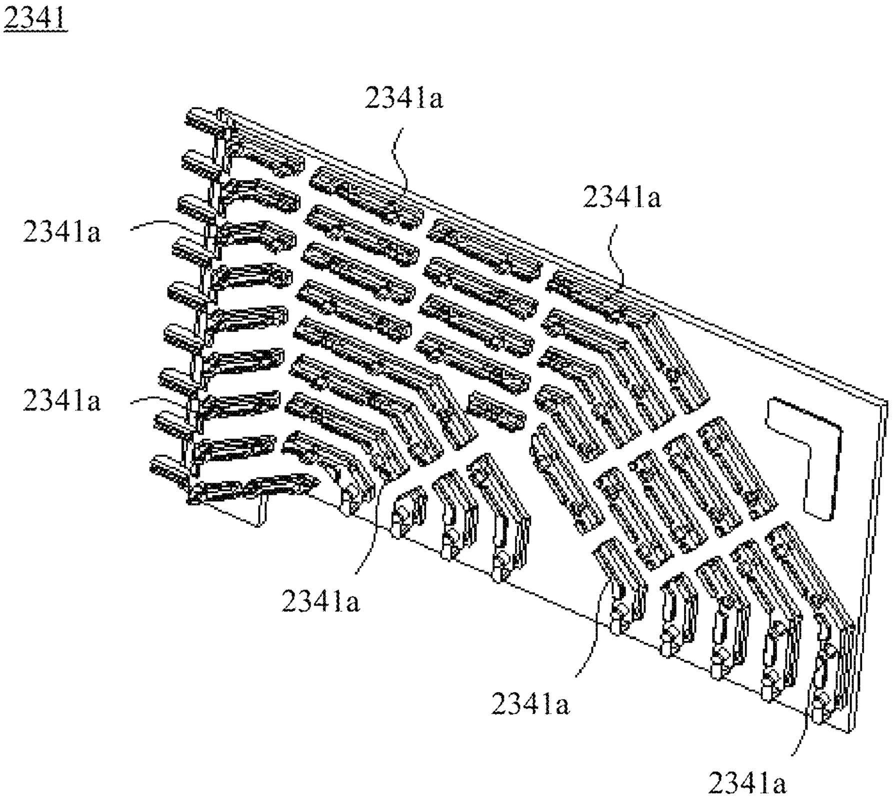
FIG. 23 is a schematic diagram of a structure of a second shielding bracket of the second submodule in FIG. 17.

As shown in FIG. 17 and FIG. 23, in this implementation, the second shielding bracket 2341 is approximately plate-shaped, and covers and is connected to the second terminal bearing member 2343. A thickness direction of the second shielding bracket 2341 keeps consistent with that of the second terminal bearing member 2343. The second shielding bracket 2341 is further configured to mount and bear the second shielding member 2342. The second shielding bracket 2341 may be a plastic part, and may be molded by using an injection molding process.

As shown in FIG. 23, a surface of the second shielding bracket 2341 may form a plurality of rows of limiting protrusions 2341*a* that are spaced from each other, and a plurality of limiting protrusions 2341*a* spaced from each other may be included in each row. A channel is formed between every two adjacent rows of limiting protrusions 2341*a*. With reference to FIG. 23 and FIG. 18, one limiting protrusion 2341*a* correspondingly passes through one second fitting through hole h2 in the second ground body part 23442 and one second limiting through hole 2343*a* in the second terminal bearing member 2343, and fits with the second fitting through hole h2 and the second limiting through hole 2343*a*. The second shielding bracket 2341 and the second terminal bearing member 2343 can be assembled together by fitting the limiting protrusion 2341*a* with the second fitting through hole h2 and the second limiting through hole 2343*a*. In addition, one second signal terminal 2345 is correspondingly accommodated in one channel, and two adjacent second signal terminals 2345 are separated by a row of limiting protrusions 2341*a*. This can reduce crosstalk between adjacent second signal terminals 2345.

In another embodiment, a specific quantity and an arrangement manner of the limiting protrusion 2341*a* may be set depending on a requirement, provided that the limiting protrusion 2341*a* can be fitted with at least some second fitting through holes h2 and at least some second limiting through holes 2343*a*. For example, several limiting protrusions 2341*a* form a plurality of rows, and there may be only one limiting protrusion 2341*a* in each row. The foregoing structure of the second shielding bracket 2341 is not mandatory. For example, the second shielding bracket 2341 may not be plate-shaped, may not be provided with a limiting protrusion 2341*a*, or even may be canceled.

As shown in FIG. 17, the second shielding member 2342 may be a sheet-shaped metal piece, and the second shielding member 2342 may be partially hollowed out to form a second hollowed-out region. The second shielding member 2342 is disposed on a side that is of the second shielding bracket 2341 and that faces the second terminal bearing member 2343. The limiting protrusion 2341*a* passes through the second hollowed-out region of the second shielding member 2342, and a protrusion height of the limiting protrusion 2341*a* may be greater than a thickness of the second shielding member 2342. The second shielding member 2342 may be nested at the root of the limiting protrusion 2341*a*. The second shielding member 2342 is located between the second shielding bracket 2341 and the second terminal bearing member 2343. The second shielding member 2342 serves as a reference ground when the second signal terminal 2345 performs signal transmission, and has an electromagnetic shielding function. In this implementation, the second shielding member 2342 fills spacings between the limiting protrusions 2341*a*. The spacings include a spacing between two adjacent rows of limiting protrusions 2341*a* and a spacing between two adjacent limiting protrusions 2341*a* in a single row of limiting protrusions 2341*a*. This can enhance isolation between two adjacent second signal terminals 2345, and further reduce crosstalk between the two adjacent second signal terminals 2345.

The second shielding member 2342 and the second shielding bracket 2341 may form an integrated structure. A surface of the second shielding member 2342 may be coated with plastics by using an in-mold injection molding process, to form the integrated structure including the second shielding bracket 2341 and the second shielding member 2342. This integrated structure has high processing precision, and reduces a quantity of components that need to be assembled in the second submodule 234, thereby improving assembly precision and ensuring electromagnetic shielding stability. In addition, the second shielding member 2342 and the second shielding bracket 2341 are integrally formed through in-mold injection molding, without a need to first obtain the second shielding bracket 2341 through injection molding and then assemble the second shielding bracket 2341 and the second shielding member 2342 together, so that costs can be reduced.

To ensure an electromagnetic shielding effect, electroplating processing may be performed on the integrated structure formed by the second shielding member 2342 and the second shielding bracket 2341, and both the surface of the second shielding member 2342 and the surface of the second shielding bracket 2341 form a conducting layer. The conducting layers may alternatively be formed by using another process.

In another embodiment, the second shielding member 2342 and the second shielding bracket 2341 may be separately designed, and then the second shielding member 2342 and the second shielding bracket 2341 may be assembled. In this solution, several fitting through holes may be disposed on the second shielding member 2342, and the limiting protrusions 2341*a* on the second shielding bracket 2341 pass through the fitting through holes. A quantity of the fitting through hole adapts to a quantity, a shape, and a location of the limiting protrusion 2341*a*. This fitting manner can also increase a contact area between the second shielding member 2342 and the second shielding bracket 2341, thereby improving a ground shielding effect. Likewise, to improve an electromagnetic shielding effect, the conducting layers may be formed on the surface of the second shielding member 2342 and the surface of the second shielding bracket 2341. Processes used for forming the conducting layers are not limited to electroplating.

As shown in FIG. 6, FIG. 15, FIG. 16, and FIG. 17, a surface that is of the second terminal bearing member 2343 and that faces the second shielding member 2342 and corresponds to the second signal body part 23452 is provided with an opening 2343*b*. The “correspondence” between the opening 2343*b* and the second signal body part 23452 means that the opening 2343*b* is basically located in the vicinity of the second signal body part 23452, for example, in the thickness direction of the second signal body part 23452. The opening 2343*b* may fall within a boundary of the second signal body part 23452, or the opening 2343*b* may overlap the boundary portion of the second signal body part 23452 or the second signal body part 23452 may fall within a boundary of the opening 2343*b*. A shape, a size, and a quantity of the opening 2343*b* may be set depending on a requirement. For example, an opening 2343*b* may be formed corresponding to a location of each second signal body part 23452. When there are a plurality of openings 2343*b*, the openings 2343*b* are spaced from each other.

The opening 2343*b* may be obtained by hollowing out a material that is of the second terminal bearing member 2343 and that covers the second signal body part 23452, and the second signal body part 23452 is exposed from the opening 2343*b* and is spaced opposite to the second shielding member 2342.

Impedance and signal attenuation of the second signal terminal 2345 can be adjusted by disposing the opening 2343*b*. Depending on a product requirement, when the impedance needs to be increased, an opening 2343*b* with a larger size may be disposed to make an opening area of the opening 2343*b* larger; otherwise, an opening 2343*b* with a smaller size may be disposed to make an opening area of the opening 2343*b* smaller. To reduce signal attenuation, an opening 2343*b* with a larger size may be disposed to make an opening area of the opening 2343*b* larger. In another embodiment, either of the second terminal bearing member 2343 or the first terminal bearing member 2333 may be provided with an opening, or neither of the second terminal bearing member 2343 nor the first terminal bearing member 2333 may be provided with an opening.

As shown in FIG. 7, in the differential pair module 231, the second submodule 234 and the first submodule 233 are stacked, the second terminal bearing member 2343 is adjacent to the first terminal bearing member 2333, the second terminal bearing member 2343 is located between the second shielding bracket 2341 and the first shielding bracket 2331, and the first terminal bearing member 2333 is located between the second shielding bracket 2341 and the first shielding bracket 2331. The second shielding bracket 2341, the second shielding member 2342, the first shielding bracket 2331, and the first shielding member 2332 may be collectively referred to as a shielding assembly.

To enhance insertion strength between the second terminal bearing member 2343 and the first terminal bearing member 2333, a first connection portion may be disposed on a surface that is of the second terminal bearing member 2343 and that faces the first terminal bearing member 2333, a second connection portion may be disposed on a surface that is of the first terminal bearing member 2333 and that faces the second terminal bearing member 2343, and the first connection portion is fitted with the second connection portion. For example, one of the first connection portion and the second connection portion may be a post, and the other connection portion may be a slot, and the post and the slot form a detachable buckling connection.

To enhance insertion strength between the second shielding bracket 2341 and the first shielding bracket 2331, the limiting protrusion 2341*a* on the second shielding bracket 2341 may be connected to the limiting protrusion 2331*a* on the first shielding bracket 2331. For example, a third connection portion may be disposed on the limiting protrusion 2341*a* on the second shielding bracket 2341, a fourth connection portion may be disposed on the limiting protrusion 2331*a* on the first shielding bracket 2331, and the third connection portion is fitted with the fourth connection portion. For example, one of the third connection portion and the fourth connection portion may be a post, and the other connection portion may be a slot, and the post and the slot form a detachable buckling connection.

The insertion strength enhancement designs can enhance insertion strength between the second submodule 234 and the first submodule 233, and enhance structural strength of the differential pair module 231. Certainly, the second terminal bearing member 2343 and the first terminal bearing member 2333 may not need to be fitted with each other but may be stacked with each other, and/or the limiting protrusion 2341*a* on the second shielding bracket 2341 may also not need to be connected to the limiting protrusion 2331*a* on the first shielding bracket 2331.

Figure 24:
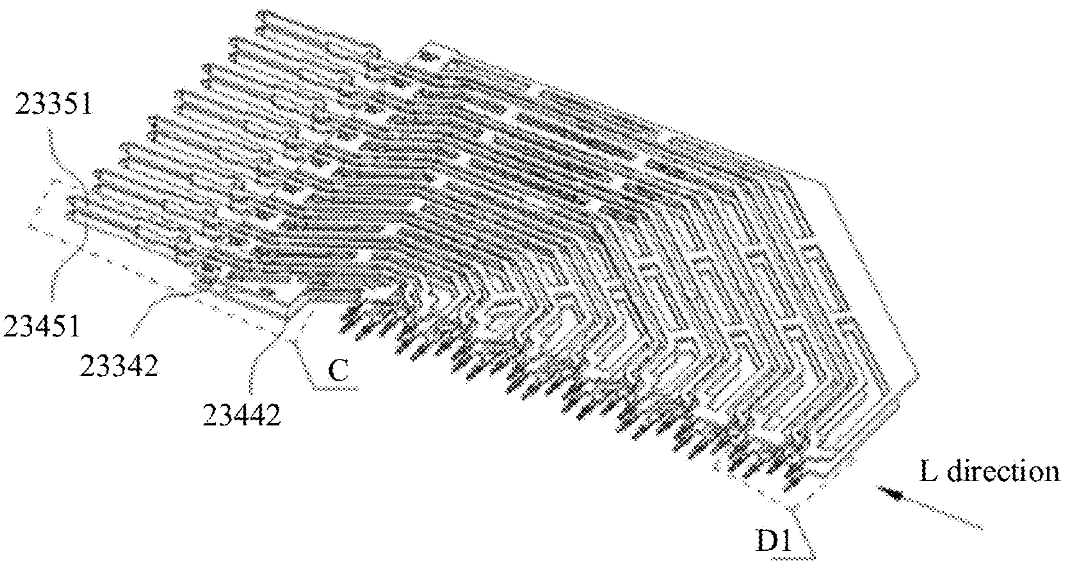
FIG. 24 is a schematic diagram of a stacked structure of terminals in a first submodule and a second submodule.
Figure 25:
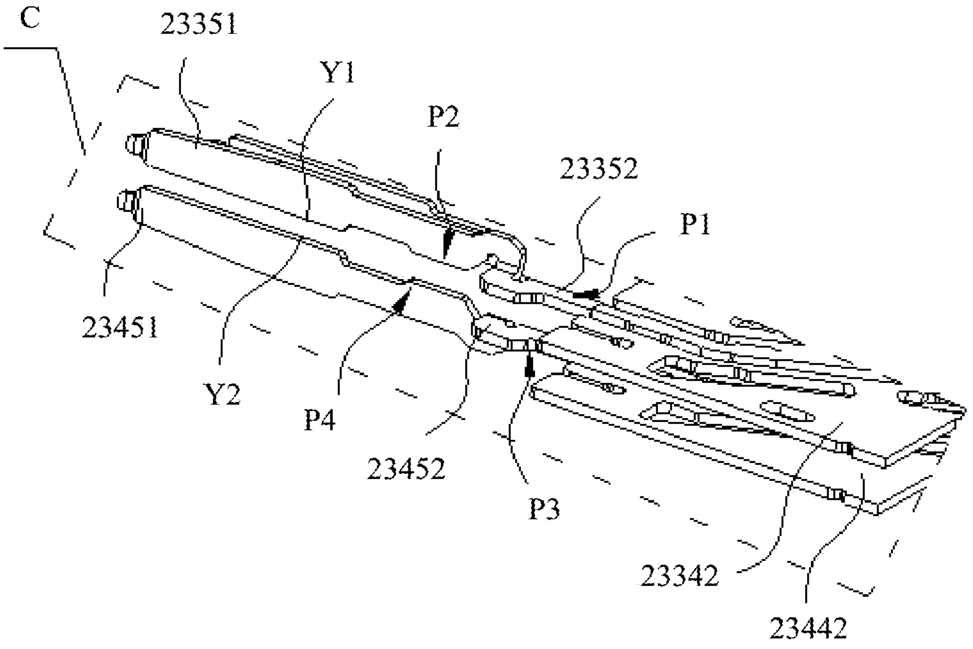
FIG. 25 is a schematic diagram of a partially enlarged structure of a location C in FIG. 24.

As shown in FIG. 24 and FIG. 25, in the differential pair module 231, locations of the first signal conductive connection part 23351 and the second signal conductive connection part 23451 correspond to and are spaced opposite to each other, and form an edge coupling. The edge coupling means that a narrower side surface Y1 in the first signal conductive connection part 23351 (this side surface Y1 is vertically connected to the extension plane P2) and a narrower side surface Y2 in the second signal conductive connection part 23451 (this side surface Y2 is vertically connected to the extension plane P4) are opposite to and spaced relatively close to each other. For example, the side surface Y1 and the side surface Y2 may be parallel to or approximately parallel to each other. In addition, a signal coupling exists between the first signal conductive connection part 23351 and the second signal conductive connection part 23451.

As shown in FIG. 24 and FIG. 25, locations of the first signal body part 23352 and the second signal body part 23452 correspond to and are spaced opposite to each other, and form a broadside coupling. The broadside coupling means that the extension plane P1 of the first signal body part 23352 and the extension plane P3 of the second signal body part 23452 are spaced relatively close to and face away from each other. For example, the extension plane P1 and the extension plane P3 may be parallel to or approximately parallel to each other. In addition, a signal coupling exists between the first signal body part 23352 and the second signal body part 23452. Locations of the first signal tail part 23353 and the second signal tail part 23453 correspond to and are spaced opposite to each other. In the first embodiment, there is an included angle between the extension direction S2 of the first signal conductive connection part 23351 and the extension direction S1 of the first signal tail part 23353, and there is an included angle between the extension direction S4 of the second signal conductive connection part 23451 and the extension direction S3 of the second signal tail part 23453. When the connector 23 is mounted at the edge of the first PCB board 22, both the first signal tail part 23353 and the second signal tail part 23453 are inserted into the first PCB board 22, and both the first signal conductive connection part 23351 and the second signal conductive connection part 23451 may protrude from a side edge of the first PCB board 22. In this way, the connector 23 can adapt to an orthogonal placement manner of the first PCB board 22 and the second PCB board 21. This facilitates inserting the connector 23 into the second PCB board 21.

Figure 26A:
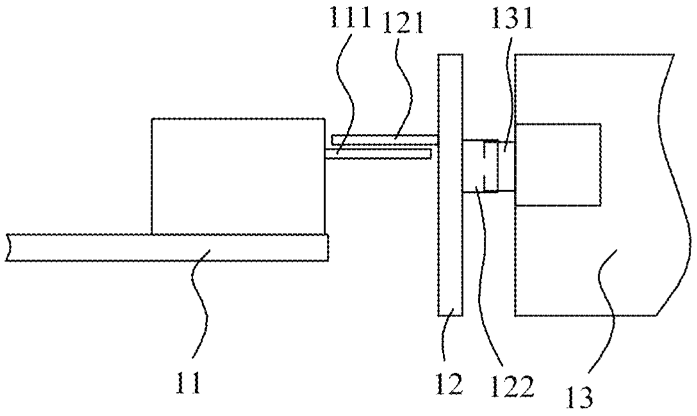
FIG. 26(*a*) is a schematic diagram of a side view structure in which PCB boards are connected by using a backplane in a conventional PCB board interconnection architecture.
Figure 26B:
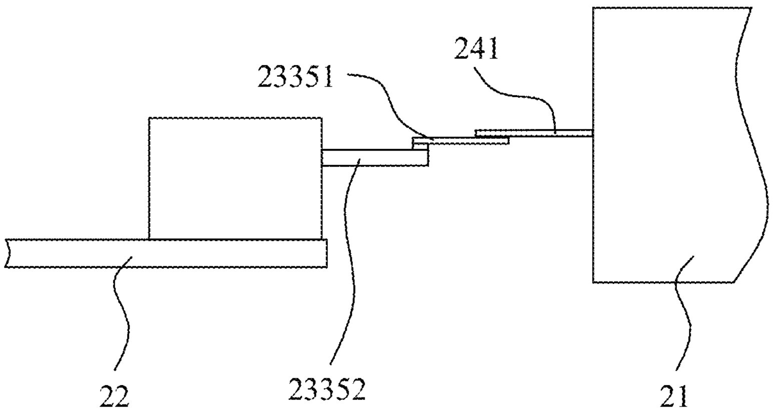

FIG. 26(*a*) is a side view of a conventional PCB board interconnection architecture. In the conventional PCB board interconnection architecture, signal exchange between a first PCB board 11 and a second PCB board 13 is implemented by using a backplane 12. A signal conductive connection part 111 in a connector of the first PCB board 11 and a signal conductive connection part 121 in a connector of the backplane 12 are connected in parallel to each other. A signal conductive connection part 131 in a connector of the second PCB board 13 and a signal conductive connection part 122 in a connector of the backplane 12 are connected in parallel to each other. At a viewing angle in FIG. 26(*a*), a thickness direction of the signal conductive connection part 111 is a vertical direction, and a thickness direction of the signal conductive connection part 131 is a direction perpendicular to a picture. It can be learned that a plane on which the signal conductive connection part 111 is located is perpendicular to a plane on which the signal conductive connection part 131 is located, and therefore the backplane 12 needs to be disposed.

FIG. 26(*b*) is a side view of direct mutual fitting between the first PCB board 22 and the second PCB board 21. In FIG. 26(*b*), that a first signal conductive connection part 23351 in the connector 23 is mutually fitted with a signal conductive connection part 241 in the second PCB board connector 24 is used as an example. Because the first signal conductive connection part 23351 is bent relative to the first signal body part 23352, the first signal conductive connection part 23351 and the signal conductive connection part 241 in the second PCB board connector 24 may be directly connected in parallel to each other without using a relay of a backplane connector. Likewise, because the second signal conductive connection part 23451 is bent relative to the second signal body part 23452, the second signal conductive connection part 23451 and a corresponding pin in the second PCB board connector 24 may also be connected in parallel to each other without using a relay of a backplane connector. In this way, the connector 23 can be used to implement a direct orthogonal interconnection between the first PCB board 22 and the second PCB board 21, so that the communications device 20 does not need a backplane.

Because no backplane needs to be disposed, a signal link between the first PCB board 22 and the second PCB board 21 can be shortened, and the communications device 20 can implement high-speed data transmission (for example, 56 Gbps to 112 Gbps) and has better ventilation and heat dissipation performance. In addition, the differential pair module 231 of the connector 23 is obtained by assembling two submodules. Compared with a solution in which two submodules are integrally formed, there are a smaller quantity of terminals (including a signal terminal and a ground terminal) in a single submodule in the differential pair module 231. This can simplify a manufacturing process of the submodules, for example, simplify a punching process of terminals and an in-mold injection molding process of the terminals. Particularly, when the first signal conductive connection part 23351 is vertically bent relative to the first signal body part 23352 and the second signal conductive connection part 23451 is vertically bent relative to the second signal body part 23452, and the extension direction S2 of the first signal conductive connection part 23351 is perpendicular to the extension direction S1 of the first signal tail part 23353 and the extension direction S4 of the second signal conductive connection part 23451 is perpendicular to the extension direction S3 of the second signal tail part 23453, the connector 23 has desirable performance. For example, an insertion loss may be −2.99 dB @14 GHz, near-end crosstalk may be −61 dB @14 GHz, and far-end crosstalk may be −58.9 dB @14 GHz.

Figure 27:
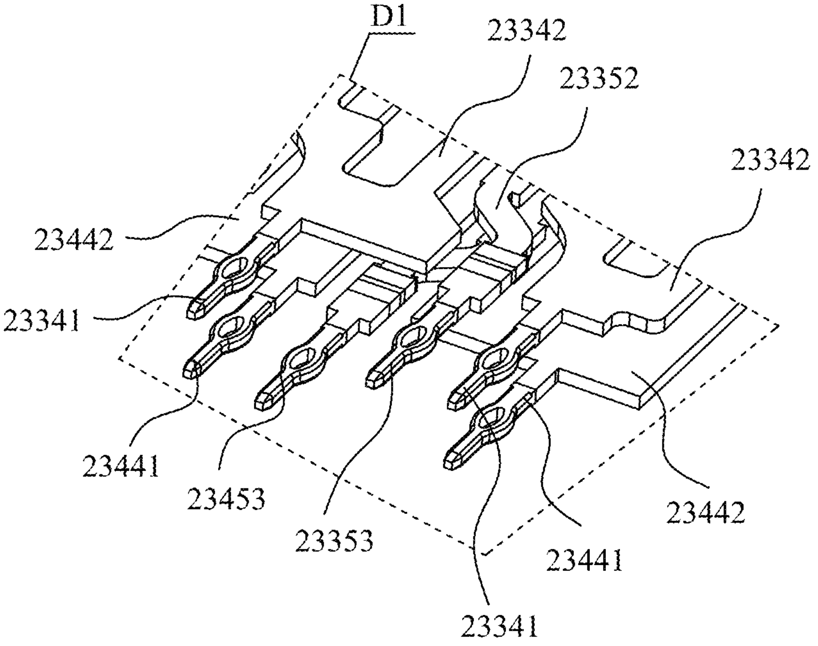
FIG. 27 is a schematic diagram of a partially enlarged structure of a location D1 in FIG. 24.

As shown in FIG. 24 and FIG. 27, in the first embodiment, the first signal tail part 23353 and the first signal body part 23352 may be flush and coplanar with each other, and the second signal tail part 23453 and the second signal body part 23452 (in FIG. 27, the second signal body part 23452 is located below the first signal body part 23352, and the second signal body part 23452 is not marked) may be flush and coplanar with each other. Both the first signal tail part 23353 and the second signal tail part 23453 can directly protrude without being bent.

As shown in FIG. 24 and FIG. 27, locations of the first ground body part 23342 and the second ground body part 23442 correspond to and are spaced opposite to each other. The first ground part 23341 and the first ground body part 23342 may be flush and coplanar with each other, and the second ground part 23441 and the second ground body part 23442 may be flush and coplanar with each other. Both the first ground part 23341 and the second ground part 23441 can directly protrude without being bent.

A second embodiment is different from the first embodiment in that, the first signal tail part 23353 and the second signal tail part 23453 in the differential pair module 231 can be coplanar with each other through bending, to form an edge coupling.

Figure 28:
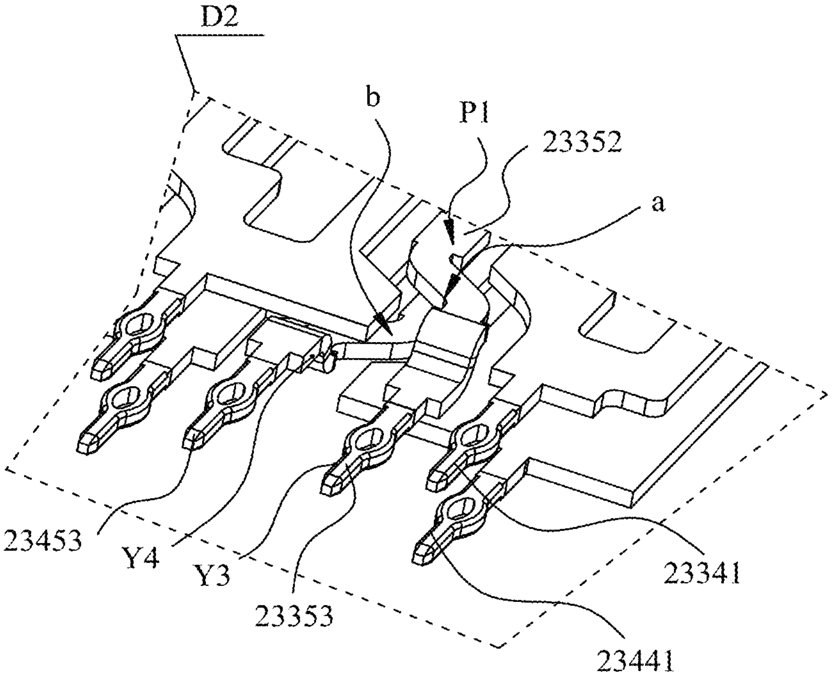
FIG. 28 is a schematic diagram of a partially enlarged structure of a stacked structure of terminals in a first submodule and a second submodule according to a second embodiment of this application, where portions included in the partially enlarged diagram D2 are consistent with portions at the location D1 in FIG. 24.
Figure 29:
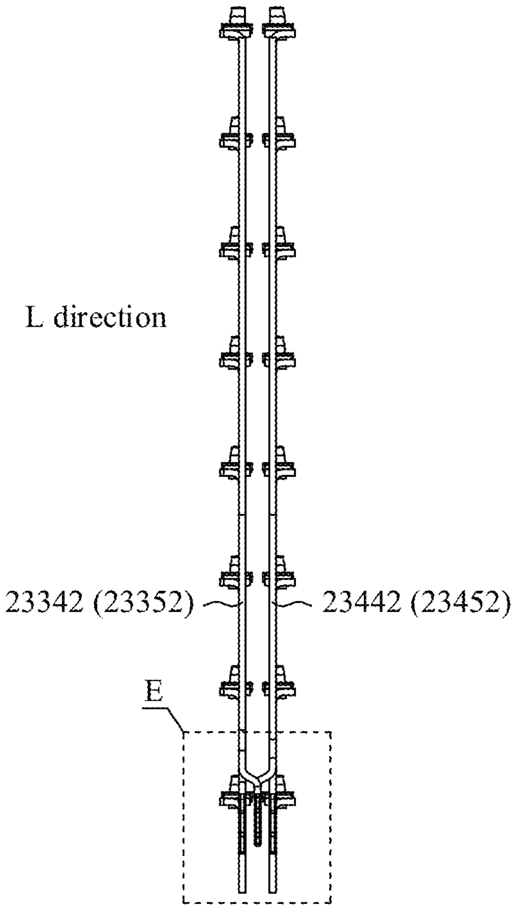
FIG. 29 is an L-direction view of a stacked structure of terminals in a first submodule and a second submodule according to a second embodiment of this application, where the L direction is an L direction in FIG. 24.
Figure 30:
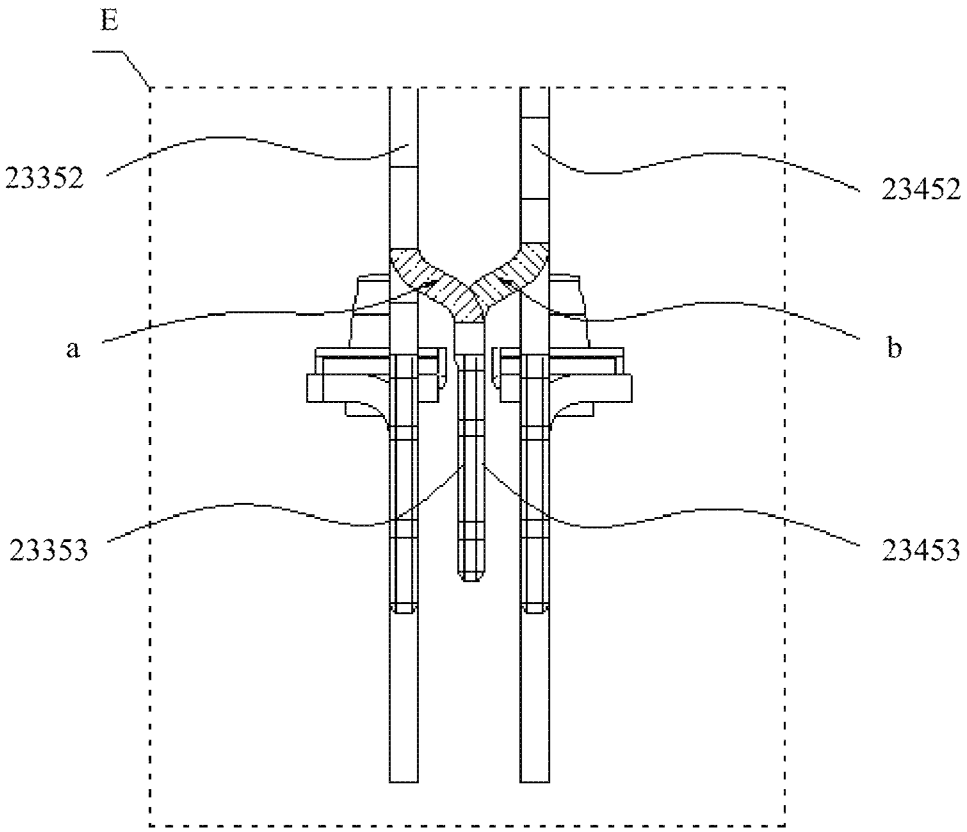
FIG. 30 is a schematic diagram of a partially enlarged structure of a location E in FIG. 29.
Figure 31:
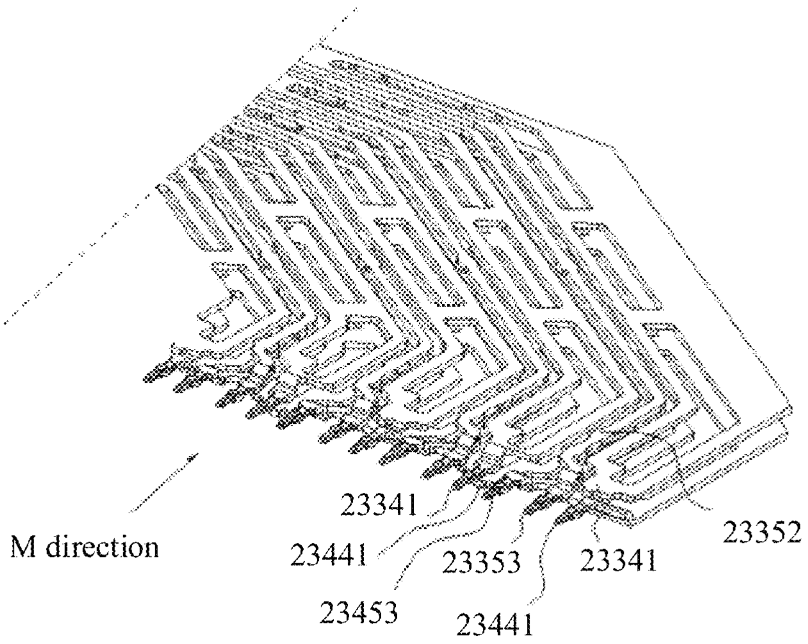
FIG. 31 is a schematic diagram of a partial stacked structure of terminals in a first submodule and a second submodule according to a third embodiment of this application.

Specifically, as shown in FIG. 28, FIG. 29, and FIG. 30, the first signal body part 23352 has a first region a connected to the first signal tail part 23353. The second signal body part 23452 has a second region b connected to the second signal tail part 23453. In FIG. 31, to highlight the first region a and the second region b, both the first region a and the second region b are schematically indicated by using shadows.

On the extension plane P1 of the first signal body part 23352, the first region a is bent relative to remaining regions of the first signal body part 23352. On a plane parallel to or approximately parallel to the extension plane P1 of the first signal body part 23352, the second region b is bent relative to remaining regions of the second signal body part 23452, and a bending direction of the second region b is opposite to a bending direction of the first region a. In this way, the first region a and the second region b intersect with each other, that is, the first region a and the second region b may form an included angle. The included angle may be set depending on a requirement. By using a value of the included angle, interference between the first region a and the first ground part 23341 and interference between the second region b and the second ground part 23441 can be avoided.

The first region a is also bent towards the second signal body part 23452, and the second region b is also bent towards the first signal body part 23352, so that the first signal tail part 23353 and the second signal tail part 23453 are flush and coplanar with each other in a stacking direction, to form an edge coupling. The stacking direction is a direction in which the first signal terminal 2335 and the second signal terminal 2345 are stacked. A meaning of the edge coupling herein is similar to that defined above. To be specific, a narrower side surface Y3 in the first signal tail part 23353 and a narrower side surface Y4 in the second signal tail part 23453 are opposite to and spaced relatively close to each other, and a signal coupling exists between the first signal tail part 23353 and the second signal tail part 23453. Ends of the first signal tail part 23353 and the second signal tail part 23453 may be flush and colinear with each other, to be conveniently inserted into the first PCB board 22, thereby ensuring insertion reliability.

In the second embodiment, the first signal tail part 23353 and the second signal tail part 23453 are bent to form the edge coupling, to satisfy requirements of signal cable arrangement and component arrangement on the first PCB board 22.

Figure 32:
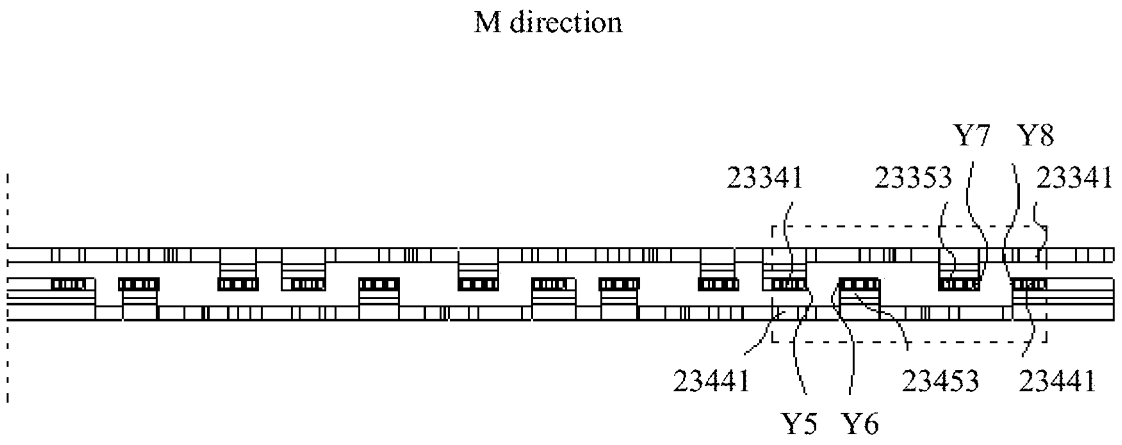
FIG. 32 is an M-direction view of FIG. 31.

Based on the second embodiment, in a third embodiment, as shown in FIG. 31 and FIG. 32, for two first ground parts 23341 on two sides of the first signal body part 23352, a first ground part 23341 on a left side is bent towards the second ground body part 23442, and is flush and coplanar with the second signal tail part 23453 in a stacking direction to form an edge coupling. The stacking direction is a direction in which the first ground terminal 2334 and the second ground terminal 2344 are stacked. A meaning of the edge coupling is similar to that defined above. To be specific, a narrower side surface Y5 in the first ground part 23341 and a narrower side surface Y6 in the second signal tail part 23453 are opposite to and spaced relatively close to each other, and a signal coupling exists between the first ground part 23341 and the second signal tail part 23453.

As shown in FIG. 31 and FIG. 32, a first ground part 23341 on a right side of the first signal body part 23352 may keep coplanar with the first ground body part 23342 without being bent, and therefore no edge coupling is formed. In another embodiment, on the contrary, the first ground part 23341 on the right side of the first signal body part 23352 may be bent to form an edge coupling, and the first ground part 23341 on the left side of the first signal body part 23352 may keep coplanar with the first ground body part 23342 without being bent and no edge coupling is formed.

Figure 33:
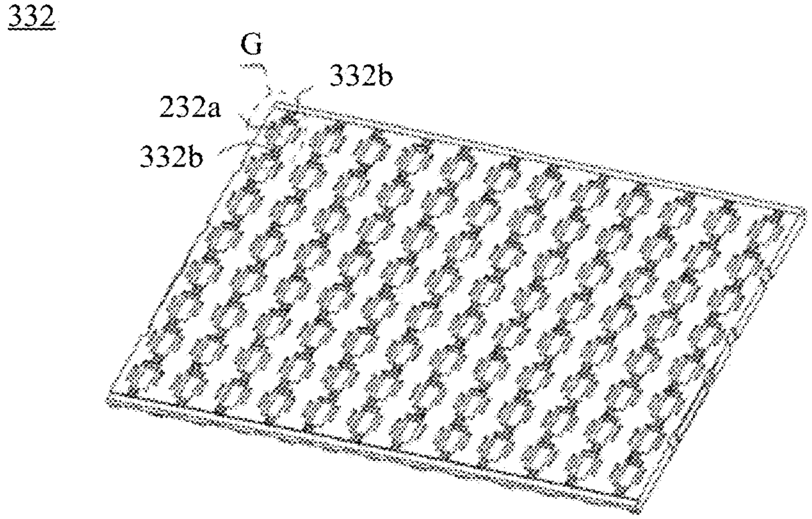
FIG. 33 is a schematic diagram of a structure of an assembling bracket according to a third embodiment of this application.

As shown in FIG. 31 and FIG. 32, for two second ground parts 23441 on two sides of the second signal body part 23452 (because the second signal body part 23452 is blocked, the second signal body part 23452 is not marked in FIG. 32 and FIG. 33), a second ground part 23441 on a right side is bent towards the first ground body part 23342, and is flush and coplanar with the first signal tail part 23353 in a stacking direction to form an edge coupling. The stacking direction is a direction in which the first ground terminal 2334 and the second ground terminal 2344 are stacked. A meaning of the edge coupling is similar to that defined above. To be specific, a narrower side surface Y8 in the second ground part 23441 and a narrower side surface Y7 in the first signal tail part 23353 are opposite to and spaced relatively close to each other, and a signal coupling exists between the second ground part 23441 and the first signal tail part 23353.

As shown in FIG. 31 and FIG. 32, a second ground part 23441 on a left side of the second signal body part 23452 may keep coplanar with the second ground body part 23442 without being bent, and therefore no edge coupling is formed. In another embodiment, on the contrary, the second ground part 23441 on the left side of the second signal body part 23452 may be bent to form an edge coupling, and the second ground part 23441 on the right side of the second signal body part 23452 may keep coplanar with the second ground body part 23442 without being bent and no edge coupling is formed.

As shown in FIG. 32, the first ground part 23341 forming the edge coupling and the second ground part 23441 forming the edge coupling are arranged diagonally, that is, the two first ground parts 23341 and the two second ground parts 23441 may be considered to form a quadrangle. A connection line between the first ground part 23341 on the left and the second ground part 23441 on the right may be used as a first diagonal line in the quadrangle, and a connection line between the first ground part 23341 on the right and the second ground part 23441 on the left may be used as a second diagonal line in the quadrangle. Both the first ground part 23341 and the second ground part 23441 on the first diagonal line form an edge coupling, and neither the first ground part 23341 nor the second ground part 23441 on the second diagonal line forms an edge coupling. In another embodiment, on the contrary, neither the first ground part 23341 nor the second ground part 23441 on the first diagonal line forms an edge coupling, and both the first ground part 23341 and the second ground part 23441 on the second diagonal line form an edge coupling.

Figure 34:
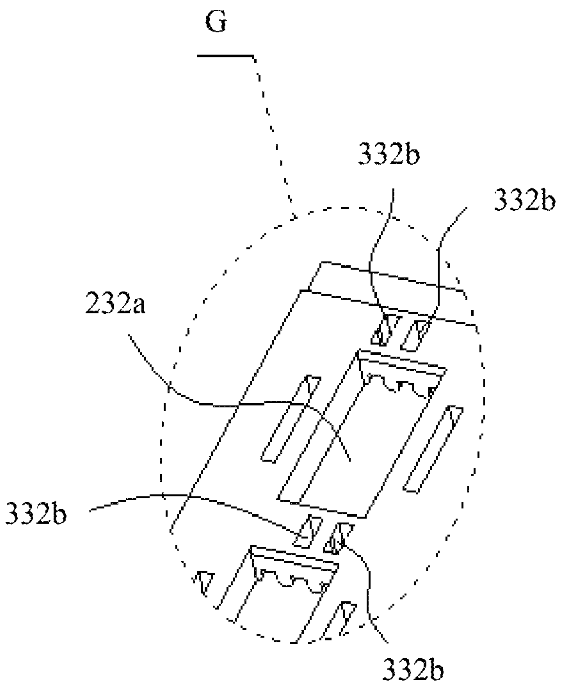
FIG. 34 is a schematic diagram of a partially enlarged structure of a location G in FIG. 33.

With reference to FIG. 31, FIG. 33, and FIG. 34, to make the ground parts be conveniently inserted into the first PCB board 22, both the first ground part 23341 and the second ground part 23441 forming the edge couplings may be in a fisheye structure, and may thread through a second through hole 332*b* of an assembling bracket 332 and come into contact with a hole wall of the second through hole 332*b*, to be connected to a common ground. In the third embodiment, a location of the second through hole 332*b* may be adjusted compared with the location of the second through hole 232*b* in the foregoing implementation, so that the second through hole 332*b* is fitted with the first ground part 23341 and the second ground part 23441.

As shown in FIG. 31 and FIG. 32, the first ground part 23341 that forms the edge coupling and that has the fisheye structure is bent towards the second ground body part 23442, so that a distance from the first ground part 23341 to the second ground part 23441 (the second ground part 23441 does not form an edge coupling) corresponding to the first ground part 23341 is shortened. If the second ground part 23441 also forms a fisheye structure and is inserted into the second PCB board 21, two vias with a relatively small spacing need to be disposed on the second PCB board 21. This is difficult to process. In view of this, the second ground part 23441 may not form a fisheye structure, and does not need to be inserted into the first PCB board 22.

Likewise, as shown in FIG. 31 and FIG. 32, the first ground part 23341 corresponding to the second ground part 23441 (the first ground part 23341 does not form an edge coupling) that forms the edge coupling and that has the fisheye structure may alternatively not form a fisheye structure.

With reference to FIG. 31 and FIG. 34, the first ground part 23341 that does not form an edge coupling and the second ground part 23441 that does not form an edge coupling may come into contact with a hole wall of a second through hole 332*b* of the assembling bracket 332, to be connected to the common ground. In the differential pair module 231 provided in this implementation, the first ground part 23341 and the second ground part 23441 are bent to form the edge coupling, to satisfy requirements of ground cable arrangement and component arrangement on the first PCB board 22.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A differential pair module, comprising a first signal terminal and a second signal terminal, wherein the first signal terminal comprises a first signal tail part, a first signal conductive connection part, and a first signal body part connected between the first signal tail part and the first signal conductive connection part, the first signal conductive connection part is connected in a bent manner to the first signal body part, the bent manner in a first direction, an extension plane of the first signal conductive connection part and an extension plane of the first signal body part form an included angle, and an extension direction of the first signal conductive connection part and an extension direction of the first signal tail part form an included angle;

the second signal terminal comprises a second signal tail part, a second signal conductive connection part, and a second signal body part connected between the second signal tail part and the second signal conductive connection part, the second signal conductive connection part is connected in a bent manner to the second signal body part, the bent manner in a second direction different than the first direction, an extension plane of the second signal conductive connection part and an extension plane of the second signal body part form an included angle, and an extension direction of the second signal conductive connection part and an extension direction of the second signal tail part form an included angle; and the second signal body part and the first signal body part are stacked with a specific spacing and form a broadside coupling, and the second signal conductive connection part and the first signal conductive connection part are stacked with a specific spacing and form an edge coupling.

2. The differential pair module according to claim 1, wherein the extension direction of the first signal conductive connection part is parallel to the extension plane of the first signal body part.

3. The differential pair module according to claim 1, wherein an angle value of the included angle formed by the extension plane of the first signal conductive connection part and the extension plane of the first signal body part is equal to an angle value of the included angle formed by the extension plane of the second signal conductive connection part and the extension plane of the second signal body part.

4. The differential pair module according to claim 3, wherein the first signal tail part is coplanar with the first signal body part, and the second signal tail part is coplanar with the second signal body part.

5. The differential pair module according to claim 3, wherein the first signal body part includes a first region connected to the first signal tail part, the second signal body part includes a second region connected to the second signal tail part, the first region intersects with the second region, the first region is bent towards the second signal body part, and the second region is bent towards the first signal body part, so that the first signal tail part and the second signal tail part form an edge coupling.

6. The differential pair module according to claim 5, comprising:

a first ground terminal and a second ground terminal;

wherein the first ground terminal is spaced from the first signal terminal, the first ground terminal comprises a first ground body part and a first ground part that are connected to each other, the first ground body part is coplanar with the first signal body part, and the first ground part and the first signal tail part are located on a same side of the first signal body part; and the second ground terminal is spaced from the second signal terminal, the second ground terminal comprises a second ground body part and a second ground part that are connected to each other, the second ground body part is coplanar with the second signal body part, and the second ground part and the second signal tail part are located on a same side of the second signal body part.

7. The differential pair module according to claim 6, wherein the first ground part is coplanar with the first ground body part, and the second ground part is coplanar with the second ground body part.

8. The differential pair module according to claim 6, wherein one first signal terminal is disposed between two first ground terminals, and a first ground part of one of the two first ground terminals is bent towards the second ground body part and is coplanar with the second signal tail part to form an edge coupling; one second signal terminal is disposed between two second ground terminals, and a second ground part of one of the two second ground terminals is bent towards the first ground body part and is coplanar with the first signal tail part to form an edge coupling; and the first ground part and the second ground part forming the edge coupling are arranged diagonally.

9. The differential pair module according to claim 8, wherein both the first ground part and the second ground part forming the edge couplings form a fisheye structure.

10. A connector, comprising one or more differential pair modules according to claim 1.

11. The connector according to claim 10, comprising:

an assembling bracket, wherein the assembling bracket is disposed on a same side of all the differential pair modules, a plurality of first through holes arranged at intervals are disposed on the assembling bracket, one first signal tail part and one second signal tail part thread through one first through hole correspondingly, and neither of them comes into contact with a hole wall of the first through hole.

12. The connector according to claim 11, wherein a plurality of second through holes arranged at intervals are disposed on the assembling bracket;

each differential pair module comprises a first ground terminal and a second ground terminal, the first ground terminal is spaced from a first signal terminal, the first ground terminal comprises a first ground body part and a first ground part that are connected to each other, the first ground body part is coplanar with a first signal body part, and the first ground part and a first signal tail part are located on a same side of the first signal body part;

the second ground terminal is spaced from a second signal terminal, the second ground terminal comprises a second ground body part and a second ground part that are connected to each other, the second ground body part is coplanar with a second signal body part, and the second ground part and a second signal tail part are located on a same side of the second signal body part; and the first ground part and the second ground part separately come into contact with a hole wall of one second through hole.

13. A communications device, comprising a first printed circuit board (PCB) board, a second PCB board, a second PCB board connector, and the connector according to claim 10, wherein the first PCB board is perpendicular to the second PCB board, and a side surface of the first PCB board is opposite to a side surface of the second PCB board, the second PCB board connector is disposed on the second PCB board, a first signal tail part of the connector is inserted into the first PCB board, and a first signal conductive connection part is inserted into the second PCB board connector.

14. A shielding assembly of a connector, comprising:

a first shielding bracket and a first shielding member, the first shielding bracket and the first shielding member are stacked and connected as a whole, and both a surface of the first shielding bracket and a surface of the first shielding member form a conducting layer; and a first limiting protrusion formed on the surface of the first shielding bracket, wherein the first shielding member includes a first hollowed-out region, and the first limiting protrusion passes through the first hollowed-out region.

15. The shielding assembly according to claim 14, comprising:

a plurality of first limiting protrusions formed on the surface of the first shielding bracket, the plurality of first limiting protrusions are spaced from each other, wherein the first shielding member includes a plurality of first hollowed-out regions, and one first limiting protrusion correspondingly passes through one first hollowed-out region.

16. The shielding assembly according to claim 15, wherein the plurality of first limiting protrusions are arranged in a plurality of spaced rows, and a plurality of spaced first limiting protrusions are comprised in each row.

17. The shielding assembly according to claim 16, further comprising:

a second shielding bracket and a second shielding member that are connected as a whole, wherein the second shielding member is adjacent to the first shielding member, and the first shielding bracket and the second shielding bracket are disposed facing away from each other;

and a second limiting protrusion is formed on a surface of the second shielding bracket, the second shielding member includes a second hollowed-out region, and the second limiting protrusion passes through the second hollowed-out region and is connected to the first limiting protrusion.

* * * * *